United States Patent
Inoue

(10) Patent No.: US 10,603,878 B2
(45) Date of Patent: Mar. 31, 2020

(54) OPTICAL LAMINATE, METHOD FOR PRODUCING SAME, POLARIZING PLATE, AND DISPLAY DEVICE

(71) Applicant: ZEON CORPORATION, Chiyoda-ku, Tokyo (JP)

(72) Inventor: Kyosuke Inoue, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 99 days.

(21) Appl. No.: 16/066,092

(22) PCT Filed: Dec. 27, 2016

(86) PCT No.: PCT/JP2016/088839
§ 371 (c)(1),
(2) Date: Jun. 26, 2018

(87) PCT Pub. No.: WO2017/115779
PCT Pub. Date: Jul. 6, 2017

(65) Prior Publication Data
US 2019/0255820 A1  Aug. 22, 2019

(30) Foreign Application Priority Data

Dec. 28, 2015 (JP) .................. 2015-257119

(51) Int. Cl.
*G02B 5/30* (2006.01)
*B32B 27/08* (2006.01)
(Continued)

(52) U.S. Cl.
CPC .......... *B32B 27/08* (2013.01); *B29C 48/0018* (2019.02); *B29C 48/022* (2019.02);
(Continued)

(58) Field of Classification Search
CPC ........ G02B 5/30; G02B 5/3033; G02B 5/305; G02B 5/3083; G02F 1/1335;
(Continued)

(56) References Cited

U.S. PATENT DOCUMENTS

2010/0076396 A1* 3/2010 Takahashi ............... B32B 15/08
604/408
2012/0164465 A1 6/2012 Takahashi et al.
(Continued)

FOREIGN PATENT DOCUMENTS

JP    H0564865 A    3/1993
JP    H09234786 A   9/1997
(Continued)

OTHER PUBLICATIONS

Jul. 3, 2018, International Preliminary Report on Patentability issued in the International Patent Application No. PCT/JP2016/088839.

*Primary Examiner* — Ricky D Shafer
(74) *Attorney, Agent, or Firm* — Kenja IP Law PC

(57) ABSTRACT

An optical layered body including: a substrate layer formed of a resin containing a crystallizable polymer A; and a first surface layer formed of a resin containing an amorphous polymer B, wherein a glass transition temperature TgA of the crystallizable polymer A and a glass transition temperature TgB of the amorphous polymer B satisfy TgB>TgA, a crystallization temperature TcA of the crystallizable polymer A and the glass transition temperature TgB of the amorphous polymer B satisfy TcA−10° C.≥TgB≥TcA−60° C., the first surface layer has a plane orientation coefficient P that satisfies P≤0.01, and a ratio of a thickness of the substrate layer relative to a total thickness of the optical layered body is 25% or more.

14 Claims, 1 Drawing Sheet

(51) Int. Cl.
    *B32B 7/027*     (2019.01)
    *B29C 48/00*     (2019.01)
    *B29C 48/08*     (2019.01)
    *B29C 48/21*     (2019.01)
    *B32B 27/32*     (2006.01)
    *G02F 1/1335*     (2006.01)
    *B32B 7/02*     (2019.01)
    *B32B 27/00*     (2006.01)
    *B29C 55/02*     (2006.01)
    *B29K 23/00*     (2006.01)
    *B29L 31/34*     (2006.01)

(52) U.S. Cl.
    CPC .............. *B29C 48/08* (2019.02); *B29C 48/21* (2019.02); *B29C 55/02* (2013.01); *B32B 7/02* (2013.01); *B32B 7/027* (2019.01); *B32B 27/00* (2013.01); *B32B 27/325* (2013.01); *G02B 5/30* (2013.01); *G02B 5/305* (2013.01); *G02B 5/3033* (2013.01); *G02B 5/3083* (2013.01); *G02F 1/1335* (2013.01); *B29K 2023/38* (2013.01); *B29K 2995/0034* (2013.01); *B29K 2995/0039* (2013.01); *B29K 2995/0041* (2013.01); *B29K 2995/0069* (2013.01); *B29K 2995/0077* (2013.01); *B29L 2031/3475* (2013.01); *B32B 2250/02* (2013.01); *B32B 2250/03* (2013.01); *B32B 2307/30* (2013.01); *B32B 2307/42* (2013.01); *B32B 2307/54* (2013.01); *B32B 2307/702* (2013.01); *B32B 2307/704* (2013.01); *B32B 2307/7265* (2013.01); *B32B 2307/732* (2013.01); *B32B 2457/202* (2013.01); *G02F 1/133528* (2013.01)

(58) Field of Classification Search
    CPC ..... G02F 1/133528; B32B 7/02; B32B 7/027; B32B 27/08; B29C 48/0018; B29C 48/022; B29C 48/08; B29C 48/21; B29C 55/02
    USPC ............................... 359/487.02, 489.07, 900
    See application file for complete search history.

(56) References Cited

U.S. PATENT DOCUMENTS

| | | |
|---|---|---|
| 2012/0165461 A1 | 6/2012 | Takahashi et al. |
| 2012/0171398 A1 | 7/2012 | Takahashi et al. |
| 2012/0208950 A1 | 8/2012 | Takahashi et al. |
| 2015/0183945 A1 | 7/2015 | Shiraishi et al. |
| 2016/0297938 A1 | 10/2016 | Shiraishi et al. |
| 2018/0043663 A1* | 2/2018 | Tsuburaya .............. B32B 27/00 |
| 2019/0011752 A1* | 1/2019 | Inoue .................. G02F 1/13363 |

FOREIGN PATENT DOCUMENTS

| | | |
|---|---|---|
| JP | 2008020895 A | 1/2008 |
| JP | 2011245788 A | 12/2011 |
| JP | 2013010309 A | 1/2013 |
| JP | 2013202919 A | 10/2013 |
| JP | 2015143842 A | 8/2015 |
| WO | 2008026733 A1 | 3/2008 |

* cited by examiner

OPTICAL LAMINATE, METHOD FOR PRODUCING SAME, POLARIZING PLATE, AND DISPLAY DEVICE

FIELD

The present invention relates to an optical layered body, a method for producing the optical layered body, and a polarizing plate and a display device that include the optical layered body.

BACKGROUND

A display device generally includes a plurality of optical films. The plurality of optical films are usually provided to the display device in a state of being bonded to each other.

On the other hand, in recent years, a resin containing a polymer having crystallizability has been proposed as a material for optical films (see Patent Literature 1).

CITATION LIST

Patent Literature

Patent Literature 1: Japanese Patent Application Laid-Open No. 2013-010309 A

SUMMARY

Technical Problem

In recent years, an increase in size of a screen of a display device has advanced. Due to the increased screen size, an optical film is required to have a large area. In general, when the area of the optical film is increased, its tendency to cause deformation such as distortion increases. In particular, when the thickness of the optical film is small, the deformation tends to easily occur. It is difficult to handle such an optical film that easily causes the deformation.

In order to prevent the deformation, the optical film is required to have higher rigidity. The inventor of the present invention has investigated use of a resin containing a crystallizable polymer to enhance the rigidity. The crystallizable polymer has a high elastic modulus. Therefore, it is expected that an optical film having a high rigidity can be realized by using a resin film containing the crystallizable polymer.

However, when the resin film containing the crystallizable polymer is bonded to another optical film, the resin film easily causes delamination. Herein, the delamination means a phenomenon where a film adhering to another member is peeled as a result of destruction of a portion of the film near a surface. In order to prevent delamination, the inventor has tried to use a layered body including a layer formed of a resin containing a crystallizable polymer and a layer formed of a resin containing an amorphous polymer in combination as an optical film. According to the investigation of the inventor, it is expected that an optical film that has a high rigidity and low tendency to cause delamination can be realized by using the layered body because the resin containing an amorphous polymer has low tendency to cause delamination.

However, the layered body including a layer formed of the resin containing a crystallizable polymer and a layer formed of the resin containing an amorphous polymer in combination as described above has low stretching suitability. Therefore, in the attempt of producing an optical film by a production method including a stretching step, defects such as a wrinkle and a breakage are caused. Accordingly, it is difficult to stably perform the production.

The present invention has been made in view of the above-described problems. An object of the present invention is to provide an optical layered body that includes a layer formed of a resin containing a crystallizable polymer, has low tendency to cause delamination, and can be easily produced by a production method including a stretching step, and a method for producing the same; and a polarizing plate and a display device that include the optical layered body.

Solution to Problem

The present inventor has intensively studied to solve the aforementioned problems. As a result, the inventor has found that when in an optical layered body including a substrate layer formed of a resin containing a crystallizable polymer and a first surface layer formed of a resin containing an amorphous polymer, a relationship between the glass transition temperature of the crystallizable polymer and the glass transition temperature of the amorphous polymer, a relationship between the crystallization temperature of the crystallizable polymer and the glass transition temperature of the amorphous polymer, the plane orientation coefficient P of the first surface layer, and the ratio of the thickness of the substrate layer relative to the total thickness of the optical layered body are appropriately controlled, the optical layered body that has low tendency to cause delamination and can be easily produced by a production method including a stretching step can be realized. Thus, the present invention has been completed.

Specifically, the present invention is as follows.

(1) An optical layered body comprising: a substrate layer formed of a resin containing a crystallizable polymer A; and a first surface layer formed of a resin containing an amorphous polymer B, wherein a glass transition temperature $TgA$ of the crystallizable polymer A and a glass transition temperature $TgB$ of the amorphous polymer B satisfy $TgB > TgA$, a crystallization temperature $TcA$ of the crystallizable polymer A and the glass transition temperature $TgB$ of the amorphous polymer B satisfy $TcA - 10°C \geq TgB \geq TcA - 60°C$, the first surface layer has a plane orientation coefficient P that satisfies P 0.01, and a ratio of a thickness of the substrate layer relative to a total thickness of the optical layered body is 25% or more.

(2) The optical layered body according to (1), having a tensile elastic modulus of 3,000 MPa or more.

(3) The optical layered body according to (1) or (2), having a retardation of 400 nm or less.

(4) The optical layered body according to any one of (1) to (3), having a moisture vapor transmission rate of 10 $g/(m^2 \cdot 24 \ h)$ or less.

(5) The optical layered body according to any one of (1) to (4), having a transmittance at a wavelength of 380 nm of 10% or less.

(6) The optical layered body according to any one of (1) to (5), wherein the substrate layer is in direct contact with the first surface layer.

(7) The optical layered body according to any one of (1) to (6), wherein the crystallizable polymer A is a crystallizable polymer containing an alicyclic structure, and the amorphous polymer B is an amorphous polymer containing an alicyclic structure.

(8) The optical layered body according to any one of (1) to (7), comprising a second surface layer on a side opposite to the first surface layer of the substrate layer, the second surface layer being formed of a resin containing an amorphous polymer B'.

(9) A polarizing plate comprising:
the optical layered body according to any one of (1) to (8); and
a polarizer, wherein
the first surface layer of the optical layered body is an outermost layer of the polarizing plate.

(10) A display device comprising the polarizing plate according to (9).

(11) A method for producing an optical layered body, the optical layered body including a substrate layer formed of a resin containing a crystallizable polymer A, and a first surface layer formed of a resin containing an amorphous polymer B,
a glass transition temperature TgA of the crystallizable polymer A and a glass transition temperature TgB of the amorphous polymer B satisfying TgB>TgA,
a crystallization temperature TcA of the crystallizable polymer A and the glass transition temperature TgB of the amorphous polymer B satisfying TcA−10° C.≥Tg-B≥TcA−60° C.,
a ratio of a thickness of the substrate layer relative to a total thickness of the optical layered body being 25% or more,
the production method comprising
a first step of preparing a pre-stretch layered body including a layer formed of a resin containing the crystallizable polymer A and a layer formed of a resin containing the amorphous polymer B;
a second step of stretching the pre-stretch layered body at a temperature of TgA or higher and TgA+60° C. or lower to obtain a stretched layered body; and
a third step of adjusting a temperature of the stretched layered body to a temperature of TcA−20° C. or higher and TcA+20° C. or lower.

(12) The method for producing an optical layered body according to (11), wherein the first step includes a step of co-extruding or co-stretching the resin containing the crystallizable polymer A and the resin containing the amorphous polymer B.

(13) The method for producing an optical layered body according to (11), wherein
the first step includes:
a step of forming the layer of the resin containing the amorphous polymer B on the layer formed of the resin containing the crystallizable polymer A, or
a step of forming the layer formed of the resin containing the crystallizable polymer A on the layer of the resin containing the amorphous polymer B.

(14) The method for producing an optical layered body according to any one of (11) to (13), wherein the substrate layer is in direct contact with the first surface layer.

Advantageous Effects of Invention

The present invention can provide an optical layered body that includes a layer formed of a resin containing a crystallizable polymer, has low tendency to cause delamination, and can be easily produced by a production method including a stretching step, and a method for producing the same; and a polarizing plate and a display device that include the optical layered body.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "crystallizable polymer" means a polymer having a melting point, unless otherwise specified. Specifically, the "crystallizable polymer" means a polymer of which the melting point is detectable by a differential scanning calorimeter (DSC), unless otherwise specified. An "amorphous polymer" means a polymer that does not show a melting point, unless otherwise specified. Specifically, the "amorphous polymer" means a polymer of which the melting point is not detectable by a differential scanning calorimeter (DSC), unless otherwise specified.

In the following description, a retardation represents an in-plane retardation, unless otherwise specified. The in-plane retardation Re of a certain film is a value represented by Re=(nx−ny)×d, unless otherwise specified. Herein, nx represents a refractive index in a direction which, among directions perpendicular to the thickness direction of the film (in-plane directions), gives the maximum refractive index. ny represents a refractive index in a direction which is perpendicular to the direction of nx among the aforementioned in-plane directions of the film. d represents the thickness of the film. The measuring wavelength is 550 nm unless otherwise specified.

In the following description, a long-length film usually means a film having a length that is 5 or more times the width, and preferably a film having a length that is 10 or more times the width, and specifically means a film having a length that allows a film to be wound up into a roll shape and stored or transported.

In the following description, a "polarizing plate" includes not only a rigid member, but also a flexible member such as a film formed from a resin, unless otherwise specified.

[1. Summary of Optical Layered Body]

Figure 1:
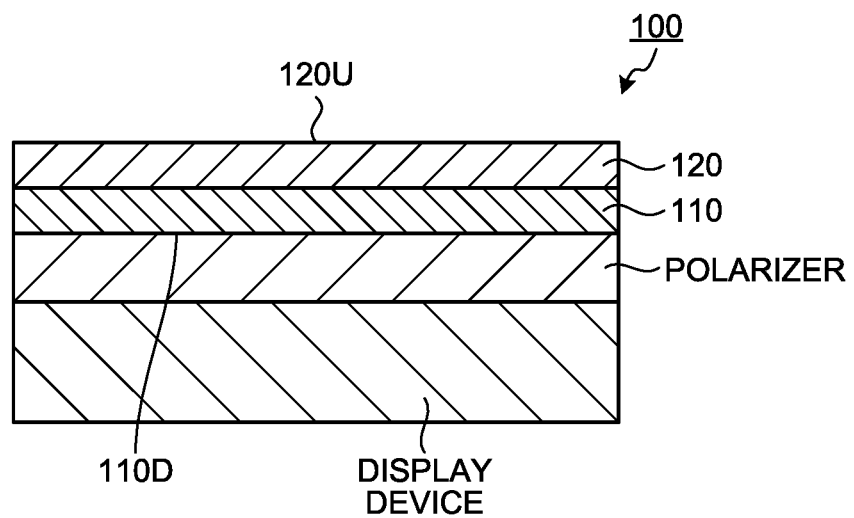
FIG. 1 is a cross-sectional view schematically illustrating an optical layered body according an example of the present invention.
Figure 2:
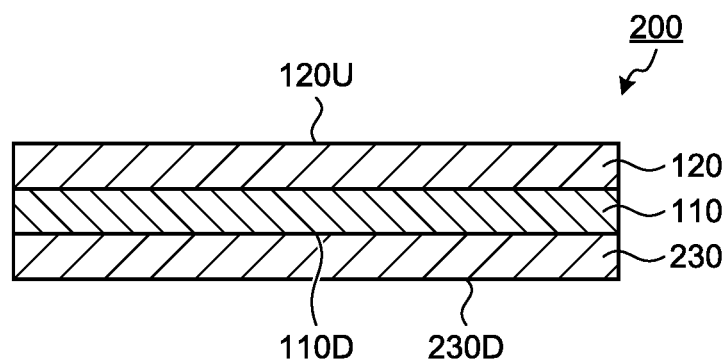
FIG. 2 is a cross-sectional view schematically illustrating an optical layered body according an example of the present invention.

FIG. 1 and FIG. 2 are cross-sectional views schematically illustrating optical layered bodies 100 and 200, respectively, according to examples of the present invention.

As the examples illustrated in FIG. 1 and FIG. 2, the optical layered bodies 100 and 200 each include a substrate layer 110 and a first surface layer 120.

The substrate layer 110 is a layer formed of a resin containing a crystallizable polymer A. In the following description, the resin containing the crystallizable polymer A may be appropriately referred to as a "crystallizable resin". The crystallizable polymer A usually has a high rigidity. Therefore, by having the substrate layer 110 formed of the crystallizable resin, the optical layered bodies 100 and 200 can have a high rigidity.

The first surface layer 120 is a layer formed of a resin containing an amorphous polymer B. In the following description, the resin containing the amorphous polymer B may be appropriately referred to as an "amorphous resin". The first surface layer 120 is an outermost layer of each of the optical layered bodies 100 and 200. Therefore, a surface 120U of the first surface layer 120 is exposed. The substrate layer 110 formed of the crystallizable resin tends to cause delamination. However, the first surface layer 120 formed of the amorphous resin has low tendency to cause delamination. Thus, since the optical layered bodies 100 and 200 include the first surface layer 120 which has low tendency to cause delamination as the outermost layer, occurrence of delamination can be suppressed in a case wherein the surface 120U of the first surface layer 120 that is the outermost surface is bonded to an optional member (not shown).

The optical layered bodies 100 and 200 further satisfy the following requirements (i) to (iv). When they satisfy the requirement (iii), they can particularly effectively suppress the occurrence of delamination. When they satisfy the requirements (i), (ii), and (iv), the optical layered bodies 100 and 200 can improve their stretching suitability while suppressing the occurrence of delamination.

(i) A glass transition temperature TgA of the crystallizable polymer A and a glass transition temperature TgB of the amorphous polymer B satisfy a specific relationship.

(ii) A crystallization temperature TcA of the crystallizable polymer A and the glass transition temperature TgB of the amorphous polymer B satisfy a specific relationship.

(iii) A plane orientation coefficient P of the first surface layer 120 falls within a specific range.

(iv) A ratio of the thickness of the substrate layer 110 relative to the total thickness of the optical layered body 100 or 200 falls within a specific range.

As illustrated in FIG. 1, the optical layered body 100 does not have to include a layer on a side opposite to the first surface layer 120 of the substrate layer 110, and the surface 110D of the substrate layer 110 may be exposed. However, as illustrated in FIG. 2, it is preferable that the optical layered body 200 includes a second surface layer 230 on a side opposite to the first surface layer 120 of the substrate layer 110, and the second surface layer 230 is formed of a resin containing an amorphous polymer B'. In this case, the optical layered body 200 includes the first surface layer 120, the substrate layer 110, and the second surface layer 230 in this order. The second surface layer 230 is an outermost layer of the optical layered body 200, and the surface 230D of the second surface layer 230 is exposed. Thus, by having the second surface layer 230, the optical layered body 200 can suppress the occurrence of delamination on both the surfaces 120U and 230D.

[2. Substrate Layer]

The substrate layer is a layer formed of the crystallizable resin containing the crystallizable polymer A. The crystallizable resin contains the crystallizable polymer A, and if necessary, further contains an optional component. Such a crystallizable resin is usually a thermoplastic resin.

As the crystallizable polymer A, various polymers may be adopted depending on properties required for the optical layered body. As the crystallizable polymer A, one type thereof may be solely used, and two or more types thereof may also be used in combination at any ratio. As the crystallizable polymer A, among these, crystallizable polymers containing an alicyclic structure are preferable. In the following description, the "crystallizable polymer containing an alicyclic structure" may be appropriately referred to as a "crystallizable alicyclic structure-containing polymer".

The crystallizable alicyclic structure-containing polymer is a crystallizable polymer having an alicyclic structure in its molecule, and examples thereof may include a polymer obtained by polymerization reaction using a cyclic olefin as a monomer or a hydrogenated product thereof. The crystallizable alicyclic structure-containing polymer has low moisture permeability and excellent heat resistance and chemical resistance.

Examples of the alicyclic structure the crystallizable alicyclic structure-containing polymer has may include a cycloalkane structure, and a cycloalkene structure. Among these, a cycloalkane structure is preferable because the optical layered body having excellent properties such as heat stability can be easily obtained. The number of carbon atoms contained in one alicyclic structure is preferably 4 or more, and more preferably 5 or more, and is preferably 30 or less, more preferably 20 or less, and particularly preferably 15 or less. When the number of carbon atoms contained in one alicyclic structure falls within the aforementioned range, mechanical strength, heat resistance, and moldability are highly balanced.

In the crystallizable alicyclic structure-containing polymer, the ratio of the structural unit having the alicyclic structure relative to all structural units is preferably 30% by weight or more, more preferably 50% by weight or more, and particularly preferably 70% by weight or more. When the ratio of the structural unit having the alicyclic structure in the crystallizable alicyclic structure-containing polymer is made large as described above, heat resistance can be enhanced.

In the crystallizable alicyclic structure-containing polymer, the remainder other than the structural unit having the alicyclic structure is not particularly limited, and may be appropriately selected depending on its purpose of use.

Examples of the crystallizable alicyclic structure-containing polymer may include the following polymer (α) to polymer (δ). Among these, the polymer (β) is preferable as the crystallizable alicyclic structure-containing polymer, because the optical layered body having excellent heat resistance can be easily obtained.

Polymer (α): a ring-opening polymer of a cyclic olefin monomer, having crystallizability Polymer (β): a hydrogenated product of polymer (α), having crystallizability Polymer (γ): an addition polymer of a cyclic olefin monomer, having crystallizability Polymer (δ): a hydrogenated product of polymer (γ), having crystallizability Specifically, the crystallizable alicyclic structure-containing polymer is more preferably a ring-opening polymer of dicyclopentadiene having crystallizability and a hydrogenated product of the ring-opening polymer of dicyclopentadiene having crystallizability, and particularly preferably a hydrogenated product of the ring-opening polymer of dicyclopentadiene having crystallizability. The ring-opening polymer of dicyclopentadiene herein means a polymer in which the ratio of a structural unit derived from dicyclopentadiene relative to all structural units is usually 50% by weight or more, preferably 70% by weight or more, more preferably 90% by weight or more, and further preferably 100% by weight.

Hereinafter, the methods for producing the polymer (α) and the polymer (β) will be described. The cyclic olefin monomer available for producing the polymer (α) and the polymer (β) is a compound which has a ring structure formed with carbon atoms and includes a carbon-carbon double bond in the ring. Examples of the cyclic olefin monomer may include a norbornene-based monomer. When the polymer ($\alpha$) is a copolymer, a monocyclic olefin may be used as the cyclic olefin monomer.

The norbornene-based monomer is a monomer that contains a norbornene ring. Examples of the norbornene-based monomer may include: a bicyclic monomer such as bicyclo[2.2.1]hept-2-ene (common name: norbornene), and 5-ethylidene-bicyclo[2.2.1]hept-2-ene (common name: ethylidene norbornene) and derivatives thereof (for example, those with a substituent on the ring); a tricyclic monomer such as tricyclo[4.3.0.1$^{2,5}$]dec-3,7-diene (common name: dicyclopentadiene) and derivatives thereof; and a tetracyclic monomer such as 7,8-benzotricyclo[4.3.0.1$^{2,5}$]dec-3-ene (common name: methanotetrahydrofluorene: also referred to as 1,4-methano-1,4,4a,9a-tetrahydrofluorene) and derivatives thereof, tetracyclo[4.4.0.1$^{2,5}$.1$^{7,10}$]dodeca-3-ene (common name: tetracyclododecene), and 8-ethylidenetetracyclo[4.4.0.1$^{2,5}$.1$^{7,10}$]-3-dodecene and derivatives thereof.

Examples of the substituent in the aforementioned monomer may include an alkyl group such as a methyl group and an ethyl group; an alkenyl group such as a vinyl group; an alkylidene group such as propane-2-ylidene; an aryl group such as a phenyl group; a hydroxy group; an acid anhydride group; a carboxyl group; and an alkoxycarbonyl group such as a methoxycarbonyl group. The monomer may solely contain one type of the aforementioned substituents, and may also contain two or more types thereof in combination at any ratio.

Examples of the monocyclic olefin may include: cyclic monoolefins such as cyclobutene, cyclopentene, methylcyclopentene, cyclohexene, methylcyclohexene, cycloheptene, and cyclooctene; and cyclic diolefins such as cyclohexadiene, methylcyclohexadiene, cyclooctadiene, methylcyclooctadiene, and phenylcyclooctadiene.

As the cyclic olefin monomer, one type thereof may be solely used, and two or more types thereof may also be used in combination at any ratio. When two or more types of the cyclic olefin monomers are used, the polymer ($\alpha$) may be a block copolymer, or a random copolymer.

Some of the cyclic olefin monomers may allow presence of endo- and exo-stereoisomers. As the cyclic olefin monomer, any of the endo- and exo-isomers may be used. One of the endo- and exo-isomers may be solely used, and an isomer mixture containing the endo- and exo-isomers at any ratio may also be used. In particular, it is preferable that the ratio of one of the stereoisomers is at high level because crystallizability of the crystallizable alicyclic structure-containing polymer is thereby enhanced and the optical layered body having excellent heat resistance can thereby be easily obtained. For example, the ratio of the endo- or exo-isomer is preferably 80% or more, more preferably 90% or more, and further preferably 95% or more. It is preferable that the ratio of the endo-isomer is high because the endo-isomer can be easily synthesized.

Usually, the polymer ($\alpha$) and the polymer ($\beta$) may have increased crystallizability by increasing the degree of syndiotactic stereoregularity thereof (the ratio of the racemo diad). From the viewpoint of increasing the degree of stereoregularity of the polymer ($\alpha$) and the polymer ($\beta$), the ratio of the racemo diad in the structural units of the polymer ($\alpha$) and the polymer ($\beta$) is preferably 51% or more, more preferably 60% or more, and particularly preferably 70% or more.

The ratio of the racemo diad may be measured by $^{13}$C-NMR spectrum analysis. Specifically, the measurement may be performed by the following method.

The $^{13}$C-NMR measurement of a polymer sample is performed at 200° C. with ortho-dichlorobenzene-d$^4$ as a solvent by an inverse-gated decoupling method. From the result of this $^{13}$C-NMR measurement, a signal at 43.35 ppm derived from the meso diad and a signal at 43.43 ppm derived from the racemo diad may be identified with the peak at 127.5 ppm of ortho-dichlorobenzene-d$^4$ as a reference shift, and the ratio of the racemo diad of the polymer sample may be determined on the basis of the ratio of the signal strength.

In synthesis of the polymer ($\alpha$), a ring-opening polymerization catalyst is usually used. As the ring-opening polymerization catalyst, one type thereof may be solely used, and two or more types thereof may also be used in combination at any ratio. It is preferable that such a ring-opening polymerization catalyst for synthesis of the polymer ($\alpha$) is a ring-opening polymerization catalyst that may cause ring-opening polymerization of the cyclic olefin monomer to produce a ring-opening polymer having syndiotactic stereoregularity. Preferable examples of the ring-opening polymerization catalyst may include ring-opening polymerization catalysts including a metal compound represented by the following formula (1):

$$M(NR^1)X_{4-a}(OR^2)_a \cdot L_b \tag{1}$$

(In the formula (1),

M is a metal atom selected from the group consisting of the Group 6 transition metal atoms in the periodic table, $R^1$ is a phenyl group optionally having a substituent at one or more of 3-, 4-, and 5-positions, or a group represented by —CH$_2$R$^3$ (wherein R$^3$ is a group selected from the group consisting of a hydrogen atom, an alkyl group optionally having a substituent, and an aryl group optionally having a substituent), $R^2$ is a group selected from the group consisting of an alkyl group optionally having a substituent and an aryl group optionally having a substituent, X is a group selected from the group consisting of a halogen atom, an alkyl group optionally having a substituent, an aryl group optionally having a substituent, and an alkylsilyl group, L is a neutral electron donor ligand, a is a number of 0 or 1, and b is an integer of 0 to 2.)

In the formula (1), M is a metal atom selected from the group consisting of the Group 6 transition metal atoms in the periodic table. M is preferably chromium, molybdenum, or tungsten, more preferably molybdenum or tungsten, and particularly preferably tungsten.

In the formula (1), R$^1$ is a phenyl group optionally having a substituent at one or more of the 3-, 4-, and 5-positions, or a group represented by —CH$_2$R$^3$. The number of carbon atoms of the phenyl group optionally having a substituent at one or more of the 3-, 4-, and 5-positions of R$^1$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio. In R$^1$, the substituents present at two or more of the 3-, 4-, and 5-positions may be bonded to each other, to form a ring structure.

Examples of the phenyl group optionally having a substituent at one or more of the 3-, 4-, and 5-positions may include an unsubstituted phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group, and a 3,4,5-trichlorophenyl group; and a 2-naphthyl group optionally having a substituent such as a 2-naphthyl group, a 3-methyl-2-naphthyl group, and a 4-methyl-2-naphthyl group.

In the group represented by —$CH_2R^3$ of $R^1$, $R^3$ is a group selected from the group consisting of a hydrogen atom, an alkyl group optionally having a substituent, and an aryl group optionally having a substituent.

The number of carbon atoms in the alkyl group optionally having a substituent of $R^3$ is preferably 1 to 20, and more preferably 1 to 10. This alkyl group may be either linear or branched. Examples of the substituent may include a phenyl group optionally having a substituent such as a phenyl group and a 4-methylphenyl group; and an alkoxyl group such as a methoxy group and an ethoxy group. As the substituent, one type thereof may be solely used, and two or more types thereof may also be used in combination at any ratio.

Examples of the alkyl group optionally having a substituent of $R^3$ may include a methyl group, an ethyl group, a propyl group, an isopropyl group, a butyl group, an isobutyl group, a t-butyl group, a pentyl group, a neopentyl group, a benzyl group, and a neophyl group.

The number of carbon atoms in the aryl group optionally having a substituent of $R^3$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio.

Examples of the aryl group optionally having a substituent of $R^3$ may include a phenyl group, a 1-naphthyl group, a 2-naphthyl group, a 4-methylphenyl group, and a 2,6-dimethylphenyl group.

Among these, the group represented by $R^3$ is preferably an alkyl group of 1 to 20 carbon atoms.

In the formula (1), $R^2$ is a group selected from the group consisting of an alkyl group optionally having a substituent and an aryl group optionally having a substituent. As the alkyl group optionally having a substituent and the aryl group optionally having a substituent of $R^2$, a group selected from groups shown as the alkyl groups optionally having a substituent and the aryl groups optionally having a substituent, respectively, of $R^3$ may be optionally used.

In the formula (1), X is a group selected from the group consisting of a halogen atom, an alkyl group optionally having a substituent, an aryl group optionally having a substituent, and an alkylsilyl group.

Examples of the halogen atom of X may include a chlorine atom, a bromine atom, and an iodine atom.

As the alkyl group optionally having a substituent and the aryl group optionally having a substituent of X, a group selected from groups shown as the alkyl groups optionally having a substituent and the aryl groups optionally having a substituent, respectively, of $R^3$ may be optionally used.

Examples of the alkylsilyl group of X may include a trimethylsilyl group, a triethylsilyl group, and a t-butyldimethylsilyl group.

When the metal compound represented by the formula (1) has two or more X's in one molecule, the X's may be the same as or different from each other. Further, the two or more X's may be bonded to each other to form a ring structure.

In the formula (1), L is a neutral electron donor ligand.

Examples of the neutral electron donor ligand of L may include an electron donor compound containing an atom of the Group 14 or 15 in the periodic table. Specific examples thereof may include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; and amines such as trimethylamine, triethylamine, pyridine, and lutidine. Among these, an ether is preferable. When the metal compound represented by the formula (1) has two or more L's in one molecule, the L's may be the same as or different from each other.

The metal compound represented by the formula (1) is preferably a tungsten compound having a phenylimido group. That is, the metal compound represented by the formula (1) wherein M is a tungsten atom and $R^1$ is a phenyl group is preferable. In particular, a tetrachlorotungsten phenylimide(tetrahydrofuran) complex is more preferable.

The method for producing the metal compound represented by the formula (1) is not particularly limited. For example, as described in Japanese Patent Application Laid-open No. Hei. 5-345817 A, the metal compound represented by the formula (1) may be produced by mixing an oxyhalogenated product of a Group 6 transition metal; a phenyl isocyanate optionally having a substituent at one or more of the 3-, 4-, and 5-positions or a monosubstituted methyl isocyanate; a neutral electron donor ligand (L); and if necessary, an alcohol, a metal alkoxide, and a metal aryloxide.

In the aforementioned production method, the metal compound represented by the formula (1) is usually obtained in a state where the compound is contained in a reaction liquid. After production of the metal compound, the aforementioned reaction liquid as it is may be used as a catalyst liquid for the ring-opening polymerization reaction. Alternatively, the metal compound may be isolated from the reaction liquid and purified by a purification treatment such as crystallization, and the resulting metal compound may be used for the ring-opening polymerization reaction.

As the ring-opening polymerization catalyst, the metal compound represented by the formula (1) may be solely used. Alternatively, the metal compound represented by the formula (1) may be used in combination with another component. For example, the metal compound represented by the formula (1) may be used in combination with an organometallic reductant, to improve polymerization activity.

Examples of the organometallic reductant may include organometallic compounds of Groups 1, 2, 12, 13, and 14 in the periodic table, having a hydrocarbon group of 1 to 20 carbon atoms. Examples of such organometallic compounds may include an organolithium such as methyllithium, n-butyllithium, and phenyllithium; an organomagnesium such as butylethylmagnesium, butyloctylmagnesium, dihexylmagnesium, ethylmagnesium chloride, n-butylmagnesium chloride, and allylmagnesium bromide; an organozinc such as dimethylzinc, diethylzinc, and diphenylzinc; an organoaluminum such as trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, and isobutylaluminum diisobutoxide; and an organotin such as tetramethyltin, tetra(n-butyl)tin, and tetraphenyltin. Among these, an organoaluminum and an organotin are preferable. As the organometallic reductant, one type thereof may be solely used, and two or more types thereof may also be used in combination at any ratio.

The ring-opening polymerization reaction is usually performed in an organic solvent. As the organic solvent, an organic solvent that allows the ring-opening polymer and a hydrogenated product thereof to be dissolved or dispersed under specific conditions and does not inhibit the ring-opening polymerization reaction and a hydrogenation reaction may be used. Examples of such an organic solvent may include an aliphatic hydrocarbon solvent such as pentane, hexane, and heptane; an alicyclic hydrocarbon solvent such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon solvent such as benzene, toluene, and xylene; a halogenated aliphatic hydrocarbon solvent such as dichloromethane, chloroform, and 1,2-dichloroethane; a halogenated aromatic hydrocarbon solvent such as chlorobenzene, and dichlorobenzene; a nitrogen-containing hydrocarbon solvent such as nitromethane, nitrobenzene, and acetonitrile; an ether solvent such as diethyl ether, and tetrahydrofuran; and mixed solvents obtained by a combination thereof. Among these organic solvents, an aromatic hydrocarbon solvent, an aliphatic hydrocarbon solvent, an alicyclic hydrocarbon solvent, and an ether solvent are preferable. As the organic solvent, one type thereof may be solely used, and two or more types thereof may also be used in combination at any ratio.

The ring-opening polymerization reaction may be initiated by mixing the cyclic olefin monomer, the metal compound represented by the formula (1), and if necessary, the organometallic reductant. The order of mixing the components is not particularly limited. For example, a solution containing the metal compound represented by the formula (1) and the organometallic reductant may be mixed in a solution containing the cyclic olefin monomer. Alternatively, a solution containing the cyclic olefin monomer and the metal compound represented by the formula (1) may be mixed in a solution containing the organometallic reductant. Further, a solution containing the metal compound represented by the formula (1) may be mixed in a solution containing the cyclic olefin monomer and the organometallic reductant. When the respective components are mixed, the total amount of each of the components may be mixed once, or the components may be mixed in a plurality of batches. The components may also be continuously mixed over a relatively long period of time (for example, 1 or more minutes).

The concentration of the cyclic olefin monomer in the reaction liquid at the time of initiation the ring-opening polymerization reaction is preferably 1% by weight or more, more preferably 2% by weight or more, and particularly preferably 3% by weight or more, and is preferably 50% by weight or less, more preferably 45% by weight or less, and particularly preferably 40% by weight or less. When the concentration of the cyclic olefin monomer is equal to or more than the lower limit value of the aforementioned range, productivity can be enhanced. When the concentration thereof is equal to or less than the upper limit value, viscosity of the reaction liquid after the ring-opening polymerization reaction can be decreased. Therefore, the subsequent hydrogenation reaction can be facilitated.

The amount of the metal compound represented by the formula (1) used in the ring-opening polymerization reaction is desirably set so that the molar ratio of "metal compound: cyclic olefin monomer" falls within a specific range. Specifically, the aforementioned molar ratio is preferably 1:100 to 1:2,000,000, more preferably 1:500 to 1,000,000, and particularly preferably 1:1,000 to 1:500,000. When the amount of the metal compound is equal to or more than the lower limit value of the aforementioned range, sufficient polymerization activity can be obtained. When the amount thereof is equal to or less than the upper limit value, the metal compound can be easily removed after the reaction.

The amount of the organometallic reductant is preferably 0.1 mol or more, more preferably 0.2 mol or more, and particularly preferably 0.5 mol or more, and is preferably 100 mol or less, more preferably 50 mol or less, and particularly preferably 20 mol or less, relative to 1 mol of the metal compound represented by the formula (1). When the amount of the organometallic reductant is equal to or more than the lower limit value of the aforementioned range, polymerization activity can be sufficiently enhanced. When the amount thereof is equal to or less than the upper limit value, occurrence of a side reaction can be suppressed.

The polymerization reaction system of the polymer ($\alpha$) may contain an activity adjuster. When the activity adjuster is used, the ring-opening polymerization catalyst can be stabilized, the reaction rate of the ring-opening polymerization reaction can be adjusted, and the molecular weight distribution of the polymer can be adjusted.

As the activity adjuster, an organic compound having a functional group may be used. Examples of the activity adjuster may include an oxygen-containing compound, a nitrogen-containing compound, and a phosphorus-containing organic compound.

Examples of the oxygen-containing compound may include: ethers such as diethyl ether, diisopropyl ether, dibutyl ether, anisole, furan, and tetrahydrofuran; ketones such as acetone, benzophenone, and cyclohexanone; and esters such as ethyl acetate.

Examples of the nitrogen-containing compound may include: nitriles such as acetonitrile and benzonitrile; amines such as triethylamine, triisopropylamine, quinuclidine, and N,N-diethylaniline; and pyridines such as pyridine, 2,4-lutidine, 2,6-lutidine, and 2-t-butylpyridine.

Examples of the phosphorous-containing compound may include: phosphines such as triphenyl phosphine, tricyclohexyl phosphine, triphenyl phosphate, and trimethyl phosphate; and phosphine oxides such as triphenyl phosphine oxide.

As the activity adjuster, one type thereof may be solely used, and two or more types thereof may also be used in combination at any ratio.

The amount of the activity adjuster in the polymerization reaction system of the polymer ($\alpha$) is preferably 0.01 mol % to 100 mol % relative to 100 mol % of the metal compound represented by the formula (1).

In order to adjust the molecular weight of the polymer ($\alpha$), the polymerization reaction system of the polymer ($\alpha$) may contain a molecular weight adjuster. Examples of the molecular weight adjuster may include: $\alpha$-olefins such as 1-butene, 1-pentene, 1-hexene, and 1-octene; an aromatic vinyl compound such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as allyl chloride; a nitrogen-containing vinyl compound such as acrylamide; non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated dienes such as 1,3-butadiene, 2-methyl-1,3-butadiene, 2,3-dimethyl-1,3-butadiene, 1,3-pentadiene, and 1,3-hexadiene.

As the molecular weight adjuster, one type thereof may be solely used, and two or more types thereof may also be used in combination at any ratio.

The amount of the molecular weight adjuster in the polymerization reaction system for polymerizing the polymer ($\alpha$) may be appropriately determined according to an intended molecular weight. The specific amount of the molecular weight adjuster is preferably in a range of 0.1 mol % to 50 mol % relative to 100 mol % of the cyclic olefin monomer.

The polymerization temperature is preferably −78° C. or higher, and more preferably −30° C. or higher, and is preferably +200° C. or lower, and more preferably +180° C. or lower.

The polymerization time may be dependent on reaction scale. The specific polymerization time is preferably in a range of 1 minute to 1,000 hours.

By the aforementioned production method, the polymer ($\alpha$) may be obtained. By hydrogenating this polymer ($\alpha$), the polymer ($\beta$) may be produced.

For example, the polymer ($\alpha$) may be hydrogenated by supplying hydrogen into the reaction system containing the polymer ($\alpha$) in the presence of a hydrogenation catalyst in accordance with an ordinary method. When reaction conditions in this hydrogenation reaction are appropriately set, the tacticity of the hydrogenated product is not usually altered by the hydrogenation reaction.

As the hydrogenation catalyst, a homogeneous catalyst or a heterogeneous catalyst that is publicly known as a hydrogenation catalyst for an olefin compound may be used.

Examples of the homogeneous catalyst may include a catalyst including a combination of a transition metal compound and an alkali metal compound, such as cobalt acetate/triethylaluminum, nickel acetylacetonate/triisobutylaluminum, titanocene dichloride/n-butyllithium, zirconocene dichloride/sec-butyllithium, and tetrabutoxy titanate/dimethylmagnesium; and a noble metal complex catalyst such as dichlorobis(triphenylphosphine)palladium, chlorohydridecarbonyltris(triphenylphosphine)ruthenium, chlorohydridecarbonylbis(tricyclohexylphosphine)ruthenium, bis(tricyclohexylphosphine)benzylidyne ruthenium (IV) dichloride, and chlorotris(triphenylphosphine)rhodium.

Examples of the heterogeneous catalyst may include a metal catalyst such as nickel, palladium, platinum, rhodium, and ruthenium; and a solid catalyst in which the aforementioned metal is supported on a carrier such as carbon, silica, diatomaceous earth, alumina, or titanium oxide, such as nickel/silica, nickel/diatomaceous earth, nickel/alumina, palladium/carbon, palladium/silica, palladium/diatomaceous earth, and palladium/alumina.

As the hydrogenation catalyst, one type thereof may be solely used, and two or more types thereof may also be used in combination at any ratio.

The hydrogenation reaction is usually performed in an inert organic solvent. Examples of the inert organic solvent may include: an aromatic hydrocarbon solvent such as benzene and toluene; an aliphatic hydrocarbon solvent such as pentane and hexane; an alicyclic hydrocarbon solvent such as cyclohexane and decahydronaphthalene; and an ether solvent such as tetrahydrofuran and ethylene glycol dimethyl ether. As the inert organic solvent, one type thereof may be solely used, and two or more types thereof may also be used in combination at any ratio. The inert organic solvent may be the same as or different from the organic solvent used in the ring-opening polymerization reaction. Furthermore, the hydrogenation catalyst may be mixed in the reaction liquid of the ring-opening polymerization reaction for performing the hydrogenation reaction.

The reaction conditions for the hydrogenation reaction usually vary depending on the hydrogenation catalyst used.

The reaction temperature of the hydrogenation reaction is preferably −20° C. or higher, more preferably −10° C. or higher, and particularly preferably 0° C. or higher, and is preferably +250° C. or lower, more preferably +220° C. or lower, and particularly preferably +200° C. or lower. When the reaction temperature is equal to or higher than the lower limit value of the aforementioned range, reaction rate can be increased. When the reaction temperature is equal to or lower than the upper limit value, occurrence of a side reaction can be suppressed.

The hydrogen pressure is preferably 0.01 MPa or more, more preferably 0.05 MPa or more, and particularly preferably 0.1 MPa or more, and is preferably 20 MPa or less, more preferably 15 MPa or less, and particularly preferably 10 MPa or less. When the hydrogen pressure is equal to or more than the lower limit value of the aforementioned range, reaction rate can be increased. When the hydrogen pressure is equal to or less than the upper limit value, a special apparatus such as a high pressure resistant reaction vessel is not required, and thereby facility costs can be reduced.

The reaction time of the hydrogenation reaction may be set to any time period during which a desired hydrogenation rate is achieved, and preferably 0.1 hour to 10 hours.

After the hydrogenation reaction, the polymer ($\beta$), which is the hydrogenated product of the polymer ($\alpha$), is usually collected in accordance with an ordinary method.

The hydrogenation rate (the ratio of a hydrogenated main-chain double bond) in the hydrogenation reaction is preferably 98% or more, and more preferably 99% or more. As the hydrogenation rate becomes higher, heat resistance of the crystallizable alicyclic structure-containing polymer can be made more favorable.

The hydrogenation rate of the polymer herein may be measured by a $^1$H-NMR measurement at 145° C. with o-dichlorobenzene-d$^4$ as a solvent.

Subsequently, the methods for producing the polymer ($\gamma$) and the polymer ($\delta$) will be described. The cyclic olefin monomer to be used for producing the polymers ($\gamma$) and ($\delta$) may be optionally selected from the range shown as the cyclic olefin monomers to be used for producing the polymer ($\alpha$) and the polymer ($\beta$). As the cyclic olefin monomer, one type thereof may be solely used, and two or more types thereof may also be used in combination at any ratio.

In the production of the polymer ($\gamma$), an optional monomer which is copolymerizable with a cyclic olefin monomer may be used as a monomer in combination with the cyclic olefin monomer. Examples of the optional monomer may include: α-olefins of 2 to 20 carbon atoms such as ethylene, propylene, 1-butene, 1-pentene, and 1-hexene; aromatic ring vinyl compounds such as styrene and α-methylstyrene; and non-conjugated dienes such as 1,4-hexadiene, 4-methyl-1,4-hexadiene, 5-methyl-1,4-hexadiene, and 1,7-octadiene. Among these, an α-olefin is preferable, and ethylene is more preferable. As the optional monomer, one type thereof may be solely used, and two or more types thereof may also be used in combination at any ratio.

The ratio between the cyclic olefin monomer and the optional monomer in terms of a weight ratio (cyclic olefin monomer:optional monomer) is preferably 30:70 to 99:1, more preferably 50:50 to 97:3, and particularly preferably 70:30 to 95:5.

When two or more types of the cyclic olefin monomers are used, or when the cyclic olefin monomer and the optional monomer are used in combination, the polymer (γ) may be a block copolymer, or a random copolymer.

For the synthesis of the polymer (γ), an addition polymerization catalyst is usually used. Examples of the addition polymerization catalyst may include a vanadium-based catalyst formed from a vanadium compound and an organoaluminum compound, a titanium-based catalyst formed from a titanium compound and an organoaluminum compound, and a zirconium-based catalyst formed from a zirconium complex and aluminoxane. As the addition polymerization catalyst, one type thereof may be solely used, and two or more types thereof may also be used in combination at any ratio.

The amount of the addition polymerization catalyst is preferably 0.000001 mol or more, and more preferably 0.00001 mol or more, and is preferably 0.1 mol or less, and more preferably 0.01 mol or less, relative to 1 mol of a monomer.

The addition polymerization of the cyclic olefin monomer is usually performed in an organic solvent. The organic solvent may be optionally selected from the range shown as the organic solvents to be used for the ring-opening polymerization of a cyclic olefin monomer. As the organic solvent, one type thereof may be solely used, and two or more types thereof may also be used in combination at any ratio.

The polymerization temperature in the polymerization for producing the polymer (γ) is preferably −50° C. or higher, more preferably −30° C. or higher, and particularly preferably −20° C. or higher, and is preferably 250° C. or lower, more preferably 200° C. or lower, and particularly preferably 150° C. or lower. The polymerization time is preferably 30 minutes or more, and more preferably 1 hour or more, and is preferably 20 hours or less, and more preferably 10 hours or less.

By the aforementioned production method, the polymer (γ) may be obtained. By hydrogenating this polymer (γ), the polymer (δ) may be produced.

The hydrogenation of the polymer (γ) may be performed by the method that is the same as the method previously described as the method for hydrogenating the polymer (α).

The weight-average molecular weight (Mw) of the crystallizable polymer A is preferably 1,000 or more, and more preferably 2,000 or more, and is preferably 1,000,000 or less, and more preferably 500,000 or less. The polymer A having such a weight-average molecular weight has an excellent balance of molding processability and heat resistance.

The molecular weight distribution (weight-average molecular weight (Mw)/number-average molecular weight (Mn)) of the crystallizable polymer A is preferably 1.0 or more, and more preferably 1.5 or more, and is preferably 4.0 or less, and more preferably 3.5 or less. The polymer A having such a molecular weight distribution is excellent in molding processability.

The weight-average molecular weight (Mw) and the number-average molecular weight (Mn) of the crystallizable polymer A may be measured as a polystyrene-equivalent value by gel permeation chromatography (GPC) using tetrahydrofuran as a development solvent.

Since the crystallizable polymer A has crystallizability, it has a melting point. The melting point of the crystallizable polymer A is preferably 200° C. or higher, and more preferably 230° C. or higher, and is preferably 290° C. or lower. When the crystallizable polymer A having such a melting point is used, the optical layered body having an excellent balance of moldability and heat resistance can be obtained.

Since the crystallizable polymer A has crystallizability, crystallization of the crystallizable polymer A proceeds at a specific temperature. In this case, the temperature at which the crystallization rate is the highest is referred to as a "crystallization temperature". The crystallization temperature TcA of the crystallizable polymer A is preferably 100° C. or higher, more preferably 130° C. or higher, and particularly preferably 160° C. or higher, and is preferably 230° C. or lower, more preferably 210° C. or lower, and particularly preferably 190° C. or lower. When the crystallization temperature TcA of the crystallizable polymer A is equal to or higher than the lower limit value of the aforementioned range, orientation relaxation of the amorphous polymer in the first surface layer can be in a proceeded state in the crystallization step. When the crystallization temperature TcA of the crystallizable polymer A is equal to or lower than the upper limit value of the aforementioned range, excessive softening of the first surface layer can be suppressed in the crystallization step. Therefore, adhesion of the first surface layer to a clip can be suppressed.

The crystallization temperature TcA may be measured using a differential scanning calorimeter (DSC).

The glass transition point TgA of the crystallizable polymer A is not particularly limited, and is usually 85° C. or higher and is usually 170° C. or lower.

The amount of the crystallizable polymer A in the crystallizable resin in the substrate layer is preferably 80.0% by weight, more preferably 85.0% by weight or more, and particularly preferably 90.0% by weight or more, and is preferably 99.0% by weight or less, more preferably 97.0% by weight or less, and particularly preferably 95.0% by weight or less. When the amount of the crystallizable polymer A falls within the aforementioned range, rigidity of the optical layered body can be effectively enhanced.

It is preferable that the substrate layer contains an ultraviolet absorber. Therefore, it is preferable that the crystallizable resin contained in the substrate layer contains an ultraviolet absorber. When the substrate layer contains an ultraviolet absorber, the optical layered body can have an ability of blocking ultraviolet light. Therefore, when the optical layered body is bonded to an optional member, the member can be protected against ultraviolet light. For example, in a polarizing plate including the optical layered body, deterioration of organic components contained in the polarizing plate due to ultraviolet light can be suppressed. Therefore, durability of the polarizing plate can be improved. In a liquid crystal display device including the polarizing plate, deterioration of a liquid crystal panel due to ultraviolet light can be suppressed. Specifically, the deterioration of the liquid crystal panel due to ultraviolet light included in external light can be suppressed by the optical layered body. When a method for producing the liquid crystal display device includes a step of establishing adhesion to the optional member by using an ultraviolet light-curable adhesive, the deterioration of the liquid crystal panel due to ultraviolet light that is used for curing the adhesive can be suppressed by the optical layered body.

As the ultraviolet absorber, a compound capable of absorbing ultraviolet light may be used. Examples of the ultraviolet absorber may include an organic ultraviolet absorber such as a triazine-based ultraviolet absorber, a benzophenone-based ultraviolet absorber, a benzotriazole-based ultraviolet absorber, and an acrylonitrile-based ultraviolet absorber.

As the triazine-based ultraviolet absorber, for example, a compound having a 1,3,5-triazine ring may preferably be used. Specific examples of the triazine-based ultraviolet absorber may include 2-(4,6-diphenyl-1,3,5-triazin-2-yl)-5-[(hexyl)oxy]-phenol and 2,4-bis(2-hydroxy-4-butoxyphenyl)-6-(2,4-dibutoxyphenyl)-1,3,5-triazine.

Examples of the benzotriazole-based ultraviolet absorber may include 2,2'-methylenebis[4-(1,1,3,3-tetramethylbutyl)-6-(2H-benzotriazol-2-yl)phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-(tert-butyl)phenol, 2-(2H-benzotriazol-2-yl)-4,6-di-tert-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, a reaction product of methyl 3-(3-(2H-benzotriazol-2-yl)-5-tert-butyl-4-hydroxyphenyl)propionate/polyethylene glycol 300, and 2-(2H-benzotriazol-2-yl)-6-(linear and side chain dodecyl)-4-methylphenol.

As the ultraviolet absorber, one type thereof may be solely used, and two or more types thereof may also be used in combination at any ratio.

The amount of the ultraviolet absorber in the crystallizable resin is preferably 1.0% by weight or more, more preferably 3.0% by weight or more, and particularly preferably 5.0% by weight or more, and is preferably 20.0% by weight or less, more preferably 15.0% by weight or less, and particularly preferably 10.0% by weight or less. When the amount of the ultraviolet absorber is equal to or more than the lower limit value of the aforementioned range, durability of the polarizing plate including the optical layered body against light such as ultraviolet light can be effectively enhanced. When the amount thereof is equal to or less than the upper limit value of the aforementioned range, light transmittance of the polarizing plate including the optical layered body can be increased. In order to set the transmittance of the optical layered body at a wavelength of 380 nm within an appropriate range, the amount of the ultraviolet absorber may be appropriately adjusted according to the thickness of the substrate layer.

The method for producing the crystallizable resin containing the ultraviolet absorber may be any method. Examples of the method may include a method in which the ultraviolet absorber is mixed in the crystallizable polymer A before production of the layered body by a melt extrusion method; a method using a masterbatch containing the ultraviolet absorber at a high concentration; and a method in which the ultraviolet absorber is mixed in the crystallizable polymer A during production of the layered body by a melt extrusion method.

In addition to the crystallizable polymer A and the ultraviolet absorber, the crystallizable resin may further contain an optional component. Examples of the optional component may include additives including a colorant such as a pigment and a dye; a plasticizer; a fluorescent brightening agent; a dispersant; a thermostabilizer; a light stabilizer; an antistatic agent; an antioxidant; and a surfactant. As the optional component, one type thereof may be solely used, and two or more types thereof may also be used in combination at any ratio.

It is preferable that the thickness of the substrate layer is set within a specific range according to the total thickness of the optical layered body. Specifically, the ratio of the thickness of the substrate layer relative to the total thickness of the optical layered body is usually 25% or more, preferably 30% or more, and more preferably 35% or more, and is preferably 80% or less, more preferably 75% or less, and particularly preferably 70% or less. When the ratio of the thickness of the substrate layer is equal to or more than the lower limit value of the aforementioned range, in a case where the optical layered body is produced by a production method including a stretching step, stretching can appropriately be performed while occurrence of defects such as a wrinkle and a breakage is suppressed. For example, in stretching at a temperature near the glass transition temperature TgA of the crystallizable polymer A, the stretching is usually performed at a temperature lower than the glass transition temperature TgB of the amorphous polymer B contained in the first surface layer. In this case, when the first surface layer is too thick, stretching of the amorphous resin may require a large force, and stable stretching may be thereby hindered in some cases. However, when the substrate layer is thick as described above, the first surface layer can be relatively thinned. This may reduce the stretching force for the amorphous resin to obtain the first surface layer, and as a result, stable stretching is possible. Therefore, when the ratio of the thickness of the substrate layer is equal to or more than the lower limit value of the aforementioned range, stretching suitability of the optical layered body can be improved. When the ratio of the thickness of the substrate layer is equal to or more than the lower limit value of the aforementioned range, the properties of the crystallizable resin contained in the substrate layer can be effectively exerted, thereby effectively enhancing the rigidity of the optical layered body. On the other hand, when the ratio of the thickness of the substrate layer is equal to or less than the upper limit value of the aforementioned range, the thickness of the surface layer can be made thick, and delamination can be effectively suppressed.

Specifically, the thickness of the substrate layer is preferably 1.0 µm or more, more preferably 5.0 µm or more, and particularly preferably 7.0 µm or more, and is preferably 45 µm or less, more preferably 35 µm or less, and particularly preferably 30 µm or less.

Herein, the thickness of each of layers contained in the optical layered body, such as the substrate layer and the surface layer (the first surface layer and the second surface layer), may be measured by the following method.

The optical layered body is embedded in an epoxy resin to prepare a test piece. The test piece is sliced in a thickness of 0.05 µm by using a microtome. After that, a cross section obtained by slicing is observed by using a microscope. Thereby the thickness of each layer contained in the optical layered body may be measured.

[3. First Surface Layer]

The first surface layer is a layer formed of an amorphous resin containing the amorphous polymer B. The amorphous resin contains the amorphous polymer B, and if necessary, further contains an optional component. Such an amorphous resin is usually a thermoplastic resin.

As the amorphous polymer B, various polymers may be used according to properties required for the optical layered body. As the amorphous polymer B, one type thereof may be solely used, and two or more types thereof may also be used in combination at any ratio. In particular, it is preferable that the amorphous polymer B is an amorphous polymer containing an alicyclic structure. In the following description, the "amorphous polymer containing an alicyclic structure" may be appropriately referred to as an "amorphous alicyclic structure-containing polymer".

The amorphous alicyclic structure-containing polymer is an amorphous polymer whose structural unit contains an alicyclic structure. The amorphous alicyclic structure-containing polymer usually has excellent resistance to humidity and heat. Therefore, when the amorphous alicyclic structure-containing polymer is used, resistance to humidity and heat of the optical layered body can be made more favorable.

The amorphous alicyclic structure-containing polymer may contain an alicyclic structure in a main chain or a side chain. In particular, a polymer containing an alicyclic structure in a main chain is preferable from the viewpoint of mechanical strength and heat resistance.

Examples of the alicyclic structure may include a saturated alicyclic hydrocarbon (cycloalkane) structure and an unsaturated alicyclic hydrocarbon (cycloalkene or cycloalkyne) structure. Among these, the cycloalkane structure and thecycloalkene structure are preferable from the viewpoint of mechanical strength and heat resistance, and the cycloalkane structure is particularly preferable.

The number of carbon atoms constituting one alicyclic structure is preferably 4 or more, and more preferably 5 or more, and is preferably 30 or less, more preferably 20 or less, and particularly preferably 15 or less. When the number of carbon atoms constituting one alicyclic structure falls within this range, mechanical strength, heat resistance, and moldability of the amorphous resin are highly balanced.

The ratio of the structural unit having the alicyclic structure in the amorphous alicyclic structure-containing polymer may be appropriately selected according to the purpose of use. The ratio of the structural unit having the alicyclic structure in the amorphous alicyclic structure-containing polymer is preferably 55% by weight or more, more preferably 70% by weight or more, and particularly preferably 90% by weight or more. When the ratio of the structural unit having the alicyclic structure in the amorphous alicyclic structure-containing polymer falls within this range, transparency and heat resistance of the amorphous resin containing the amorphous alicyclic structure-containing polymer are made favorable.

Examples of the amorphous alicyclic structure-containing polymer may include a norbornene-based polymer, a monocyclic olefin-based polymer, a cyclic conjugated diene-based polymer, a vinyl alicyclic hydrocarbon polymer, and hydrogenated products thereof. Among these, a norbornene-based polymer is more preferable because it has favorable transparency and moldability.

Examples of the norbornene-based polymer may include a ring-opening polymer of a monomer having a norbornene structure, and a hydrogenated product thereof; and an addition polymer of a monomer having a norbornene structure, and a hydrogenated product thereof. Examples of the ring-opening polymer of a monomer having a norbornene structure may include a ring-opening homopolymer of one type of monomer having a norbornene structure, a ring-opening copolymer of two or more types of monomers having a norbornene structure, and a ring-opening copolymer of a monomer having a norbornene structure with an optional monomer which is copolymerizable with the monomer. Examples of the addition polymer of a monomer having a norbornene structure may include an addition homopolymer of one type of monomer having a norbornene structure, an addition copolymer of two or more types of monomers having a norbornene structure, and an addition copolymer of a monomer having a norbornene structure with an optional monomer which is copolymerizable with the monomer. Among these, the hydrogenated product of the ring-opening polymer of a monomer having a norbornene structure is particularly suitable from the viewpoint of moldability, heat resistance, low hygroscopicity, size stability, and light-weight property.

Examples of the monomer having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$]dec-3-ene (common name: methanotetrahydrofluorene), tetracyclo[4.4.0.1$^{2,5}$.1$^{7,10}$]dodec-3-ene (common name: tetracyclododecene), and derivatives of the compounds (for example, those with a substituent on the ring). Examples of the substituent may include an alkyl group, an alkylene group, and a polar group. A plurality of substituents, which may be the same as or different from each other, may be bonded to the ring. As the monomer having a norbornene structure, one type thereof may be solely used, and two or more types thereof may also be used in combination at any ratio.

Examples of the type of the polar group may include a heteroatom and an atomic group having a heteroatom. Examples of the heteroatom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, a nitrile group, and a sulfonic acid group.

Examples of the monomer which is ring-opening copolymerizable with the monomer having a norbornene structure may include monocyclic olefins such as cyclohexene, cycloheptene, and cyclooctene, and derivatives thereof; and cyclic conjugated dienes such as cyclohexadiene and cycloheptadiene, and derivatives thereof. As the monomer which is ring-opening copolymerizable with the monomer having a norbornene structure, one type thereof may be solely used, and two or more types thereof may also be used in combination at any ratio.

The ring-opening polymer of the monomer having a norbornene structure may be produced, for example, by polymerization or copolymerization of the monomer in the presence of a ring-opening polymerization catalyst.

Examples of the monomer which is addition copolymerizable with the monomer having a norbornene structure may include α-olefins of 2 to 20 carbon atoms such as ethylene, propylene, and 1-butene, and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Among these, an α-olefin is preferable, and ethylene is more preferable. As the monomer which is addition copolymerizable with the monomer having a norbornene structure, one type thereof may be solely used, and two or more types thereof may also be used in combination at any ratio.

The addition polymer of the monomer having a norbornene structure may be produced, for example, by polymerization or copolymerization of the monomer in the presence of an addition polymerization catalyst.

The hydrogenated products of the ring-opening polymer and the addition polymer described above may be produced, for example, by hydrogenation of an unsaturated carbon-carbon bond, preferably 90% or more of an unsaturated carbon-carbon bond, in a solution of the ring-opening polymer and the addition polymer in the presence of a hydrogenation catalyst containing a transition metal such as nickel and palladium.

Of the norbornene-based polymer, preferable is a norbornene-based polymer which has as structural units X: a bicyclo[3.3.0]octane-2,4-diyl-ethylene structure and Y: a tricyclo[4.3.0.1$^{2,5}$]decane-7,9-diyl-ethylene structure, and in which the amount of the structural units relative to the total amount of the structural unit in the norbornene-based polymer is 90% by weight or more and the ratio by weight of X relative to Y, X:Y, is 100:0 to 40:60. When such a polymer is used, the first surface layer containing the norbornene-based polymer can have an excellent stability of optical properties without size change over a long period of time.

The weight-average molecular weight (Mw) of the norbornene-based polymer is preferably 10,000 or more, more preferably 15,000 or more, and particularly preferably 20,000 or more, and is preferably 100,000 or less, more preferably 80,000 or less, and particularly preferably 50,000 or less. When the weight-average molecular weight falls within this range, mechanical strength and molding processability of the first surface layer are highly balanced.

The molecular weight distribution (weight-average molecular weight (Mw)/number-average molecular weight (Mn)) of the norbornene-based polymer is preferably 1.2 or more, more preferably 1.5 or more, and particularly preferably 1.8 or more, and is preferably 3.5 or less, more preferably 3.0 or less, and particularly preferably 2.7 or less. When the molecular weight distribution is equal to or more than the lower limit value of the aforementioned range, productivity of the polymer can be enhanced, and the production costs thereof can be decreased. When the molecular weight distribution is equal to or less than the upper limit value, the amount of a low-molecular component is decreased. Therefore, relaxation during high-temperature exposure can be suppressed, and stability of the first surface layer can be enhanced.

The weight-average molecular weight (Mw) and the number-average molecular weight (Mn) may be measured as a weight-average molecular weight of polyisoprene- or polystyrene-equivalent by gel permeation chromatography using cyclohexane as a solvent. When a sample is not dissolved in cyclohexane, toluene may be used as the solvent.

The amorphous alicyclic structure-containing polymer is preferably a vinyl alicyclic hydrocarbon polymer, and particularly preferably a polymer having a hydrogenated product unit (a) of an aromatic vinyl compound and a hydrogenated product unit (b) of a diene compound. Hereinafter, the "polymer having a hydrogenated product unit (a) of an aromatic vinyl compound and a hydrogenated product unit (b) of a diene compound" may be appropriately referred to as a "polymer (X)". When the polymer (X) is used, the first surface layer having excellent heat resistance and mechanical strength, low moisture permeability, and small retardation can be easily realized.

The hydrogenated product unit (a) of an aromatic vinyl compound is a structural unit having a structure that is obtained by polymerizing an aromatic vinyl compound and hydrogenating unsaturated bonds thereof. The hydrogenated product unit (a) of an aromatic vinyl compound encompasses units obtained by any production methods as long as it has the structure.

Similarly in the present application, for example, a structural unit having a structure obtained by polymerizing styrene and hydrogenating unsaturated bonds thereof is sometimes referred to as a styrene hydrogenated product unit. The styrene hydrogenated product unit encompasses units obtained by any production methods as long as it has the structure.

Examples of the hydrogenated product unit (a) of an aromatic vinyl compound may include a structural unit represented by the following formula (X1).

In the formula (X1), $R^{xc}$ is an alicyclic hydrocarbon group. Examples of $R^{xc}$ may include cyclohexyl groups such as a cyclohexyl group; and decahydronaphtyl groups.

In the formula (X1), $R^{x1}$, $R^{x2}$, and $R^{x3}$ are each independently a hydrogen atom, a chain hydrocarbon group, a halogen atom, an alkoxy group, a hydroxyl group, an ester group, a cyano group, an amido group, an imido group, a silyl group, or a chain hydrocarbon group substituted by a polar group (a halogen atom, an alkoxy group, a hydroxyl group, an ester group, a cyano group, an amido group, an imido group, or a silyl group). In particular, it is preferable that $R^{x1}$, $R^{x2}$, and $R^{x3}$ are each a hydrogen atom or a chain hydrocarbon group of 1 to 6 carbon atoms from the viewpoint of heat resistance, low birefringence, and mechanical strength. As the chain hydrocarbon group, a saturated hydrocarbon group is preferable, and an alkyl group is more preferable.

Specific examples of the hydrogenated product unit (a) of an aromatic vinyl compound may include a structural unit represented by the following formula (X1-1). The structural unit represented by the formula (X1-1) is a styrene hydrogenated product unit.

When there are stereoisomers of the examples of the hydrogenated product unit (a) of an aromatic vinyl compound, any of the stereoisomers may be used. As the hydrogenated product unit (a) of an aromatic vinyl compound, one type thereof may be solely used, or two or more types thereof may also be used in combination at any ratio.

The hydrogenated product unit (b) of a diene compound is a structural unit having a structure obtained by polymerizing a diene compound, and if the obtained polymer has unsaturated bonds, hydrogenating the unsaturated bonds. The hydrogenated product unit (b) of a diene compound encompasses units obtained by any production methods as long as it has the structure.

Similarly in the present application, for example, a structural unit having a structure obtained by polymerizing isoprene and hydrogenating unsaturated bonds thereof is sometimes referred to as an isoprene hydrogenated product unit. The isoprene hydrogenated product unit encompasses units obtained by any production methods as long as it has the structure.

It is preferable that the hydrogenated product unit (b) of a diene compound has a structure that is obtained by polymerizing a conjugated diene compound such as a linear conjugated diene compound and hydrogenating unsaturated bonds thereof. Examples thereof may include a structural unit represented by the following formula (X2) and a structural unit represented by the following formula (X3).

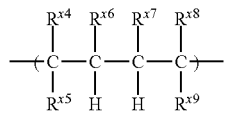
(X2)

In the formula (X2), $R^{x4}$ to $R^{x9}$ are each independently a hydrogen atom, a chain hydrocarbon group, a halogen atom, an alkoxy group, a hydroxyl group, an ester group, a cyano group, an amido group, an imido group, a silyl group, or a chain hydrocarbon group substituted by a polar group (a halogen atom, an alkoxy group, a hydroxyl group, an ester group, a cyano group, an amido group, an imido group, or a silyl group). In particular, it is preferable that $R^{x4}$ to $R^{x9}$ are each a hydrogen atom or a chain hydrocarbon group of 1 to 6 carbon atoms from the viewpoint of heat resistance, low birefringence, and mechanical strength. The chain hydrocarbon group is preferably a saturated hydrocarbon group, and more preferably an alkyl group.

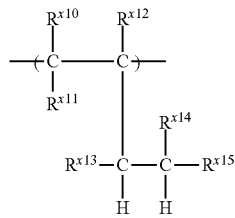
(X3)

In the formula (X3), $R^{x10}$ to $R^{x15}$ are each independently a hydrogen atom, a chain hydrocarbon group, a halogen atom, an alkoxy group, a hydroxyl group, an ester group, a cyano group, an amido group, an imido group, a silyl group, or a chain hydrocarbon group substituted by a polar group (a halogen atom, an alkoxy group, a hydroxyl group, an ester group, a cyano group, an amido group, an imido group, or a silyl group). In particular, it is preferable that $R^{x10}$ to $R^{x15}$ are each a hydrogen atom or a chain hydrocarbon group of 1 to 6 carbon atoms from the viewpoint of heat resistance, low birefringence, and mechanical strength. The chain hydrocarbon group is preferably a saturated hydrocarbon group, and more preferably an alkyl group.

Specific examples of the hydrogenated product unit (b) of a diene compound may include structural units represented by the following formulae (X2-1) to (X2-3). The structural units represented by the formulae (X2-1) to (X2-3) are isoprene hydrogenated product units.

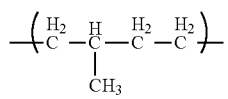
(X2-1)

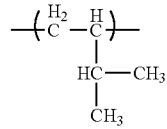
(X2-2)

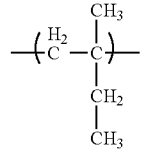
(X2-3)

When there are stereoisomers of the examples of the hydrogenated product unit (b) of a diene compound, any of the stereoisomers may also be used. As the hydrogenated product unit (b) of a diene compound, one type thereof may be solely used, and two or more types thereof may also be used in combination at any ratio.

It is preferable that the polymer (X) contains a block A having the hydrogenated product unit (a) of an aromatic vinyl compound and a copolymerization block B having the hydrogenated product unit (a) of an aromatic vinyl compound and the hydrogenated product unit (b) of a diene compound. It is further preferable that the polymer (X) has a triblock molecular structure having one copolymerization block B per molecule and two blocks A bonded to respective ends of the copolymerization block B per molecule.

It is particularly preferable that the polymer (X) having the triblock molecular structure has a block A1 and a block A2 as the two blocks A per molecule, and that the ratio by weight A1/A2 of the block A1 relative to the block A2 falls within a specific range. The ratio by weight A1/A2 is preferably 40/5 to 70/5, and more preferably 50/5 to 60/5. When the polymer (X) has the triblock molecular structure and the ratio by weight A1/A2 falls within the range, the first surface layer having excellent heat resistance and mechanical strength, low moisture permeability, and small retardation can be easily realized. In particular, the first surface layer having excellent heat resistance can be easily obtained.

In the polymer (X), it is preferable that the ratio by weight (a)/(b) of the hydrogenated product unit (a) of an aromatic vinyl compound relative to the hydrogenated product unit (b) of a diene compound falls within a specific range. The ratio by weight (a)/(b) is preferably 70/30 to 85/15, and more preferably 75/25 to 80/20. When the ratio by weight (a)/(b) falls within this range, the first surface layer having excellent heat resistance and mechanical strength, low moisture permeability, and small retardation can be easily obtained. When the ratio by weight (a)/(b) falls within this range, the optical layered body having high tear strength and impact strength, and low expression of retardation can be easily obtained.

The weight-average molecular weight of the polymer (X) is preferably 80,000 or more, and more preferably 90,000 or more, and is preferably 150,000 or less, and more preferably 130,000 or less. When the weight-average molecular weight falls within the range, in particular, is equal to or more than the aforementioned lower limit, the first surface layer having excellent heat resistance and mechanical strength, low moisture permeability, and small retardation can be easily realized. In particular, the first surface layer having excellent heat resistance can be easily obtained. Herein, the weight-average molecular weight of the polymer (X) may be measured as a polystyrene-equivalent value by GPC using tetrahydrofuran as a solvent.

The molecular weight distribution (weight-average molecular weight (Mw)/number-average molecular weight (Mn)) of the polymer (X) is preferably 2 or less, more preferably 1.5 or less, and further preferably 1.2 or less. The lower limit of the molecular weight distribution may be 1.0 or more. By having such a molecular weight distribution, polymer viscosity can be decreased and moldability can be enhanced.

It is preferable that the block A is composed of only the hydrogenated product unit (a) of an aromatic vinyl compound. However, the block A may contain an optional unit in addition to the hydrogenated product unit (a) of an aromatic vinyl compound. Examples of the optional structural unit may include a structural unit derived from a vinyl compound other than the hydrogenated product unit (a) of an aromatic vinyl compound. The content ratio of the optional structural unit in the block A is preferably 10% by weight or less, more preferably 5% by weight or less, and particularly preferably 1% by weight or less.

It is preferable that the copolymerization block B is composed of only the hydrogenated product unit (a) of an aromatic vinyl compound and the hydrogenated product unit (b) of a diene compound. However, the copolymerization block B may contain an optional unit in addition to these hydrogenated product units. Examples of the optional structural unit may include a structural unit derived from a vinyl compound other than the hydrogenated product unit (a) of an aromatic vinyl compound. The content ratio of the optional structural unit in the block B is preferably 10% by weight or less, more preferably 5% by weight or less, and particularly preferably 1% by weight or less.

The method for producing the polymer (X) is not particularly limited, and any optional production method may be adopted. For example, the polymer (X) may be produced by preparing monomers corresponding to the hydrogenated product unit (a) of an aromatic vinyl compound and the hydrogenated product unit (b) of a diene compound, polymerizing the monomers, and hydrogenating the obtained polymer.

As the monomer corresponding to the hydrogenated product unit (a) of an aromatic vinyl compound, an aromatic vinyl compound may be used. Examples thereof may include styrenes such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, and 4-phenylstyrene; vinylcyclohexanes such as vinylcyclohexane and 3-methylisopropenylcyclohexane; and vinylcyclohexene such as 4-vinylcyclohexene, 4-isopropenylcyclohexene, 1-methyl-4-vinylcyclohexene, 1-methyl-4-isopropenylcyclohexene, 2-methyl-4-vinylcyclohexene, and 2-methyl-4-isopropenylcyclohexene. As the monomers, one type thereof may be solely used, and two or more types thereof may also be used in combination at any ratio.

Examples of the monomer corresponding to the hydrogenated product unit (b) of a diene compound may include chain conjugated dienes such as butadiene, isoprene, 2,3-dimethyl-1,3-butadiene, 1,3-pentadiene, and 1,3-hexadiene. As the monomers, one type thereof may be solely used, and two or more types thereof may also be used in combination at any ratio.

As a reaction style for polymerization, an anionic polymerization may be usually adopted. The polymerization may be performed by any of bulk polymerization, solution polymerization, and the like. Among these, solution polymerization is preferable for successively performing a polymerization reaction and a hydrogenation reaction.

Examples of a reaction solvent for polymerization may include an aliphatic hydrocarbon solvent such as n-butane, n-pentane, isopentane, n-hexane, n-heptane, and isooctane; an alicyclic hydrocarbon solvent such as cyclopentane, cyclohexane, methylcyclopentane, methylcyclohexane, and decalin; and an aromatic hydrocarbon solvent such as benzene and toluene. Among these, an aliphatic hydrocarbon solvent and an alicyclic hydrocarbon solvent are preferable. This is because the aliphatic hydrocarbon solvent or the alicyclic hydrocarbon solvent as it is can also be used as an inert solvent in a hydrogenation reaction.

As the reaction solvent, one type thereof may be solely used, and two or more types thereof may also be used in combination at any ratio.

The amount of the reaction solvent is usually 200 parts by weight to 10,000 parts by weight relative to 100 parts by weight of all monomers.

In polymerization, a polymerization initiator is usually used. Examples of the polymerization initiator may include monoorganolithium such as n-butyllithium, sec-butyllithium, t-butyllithium, hexyllithium, and phenyllithium; and a polyfunctional organolithium compound such as dilithiomethane, 1,4-dilithiobutane, and 1,4-dilithio-2-ethylcyclohexane. As the polymerization initiator, one type thereof may be solely used, and two or more types thereof may also be used in combination at any ratio.

Examples of the method for producing a triblock copolymer containing the blocks A1 and A2 and the copolymerization block B as the polymer (X) may include a production method including the following step (I) to step (III). Herein, a material referred to as a "monomer composition" includes not only a mixture of two or more types of materials but also a material composed of a single material.

Step (I): A step of polymerizing a monomer composition (a1) containing an aromatic vinyl compound to form the block A.

Step (II): A step of polymerizing a monomer composition containing an aromatic vinyl compound and a diene compound at one end of the obtained block A to form the copolymerization block B, thereby forming a polymer of diblock A-B.

Step (III): A step of polymerizing a monomer composition (a2) containing an aromatic vinyl compound at an end of the polymer of the diblock on a copolymerization block B side to obtain a block copolymer. Herein, the monomer compositions (a1) and (a2) may be the same as or different from each other.

During polymerization of each of the polymer blocks, a polymerization promoter and a randomizer may be used to prevent a chain of one component in each block from being excessively elongated. For example, when the polymerization is performed by anionic polymerization, a Lewis base compound may be used as a randomizer. Specific examples of the Lewis base compound may include an ether compound such as dimethyl ether, diethyl ether, diisopropyl ether, dibutyl ether, tetrahydrofuran, diphenyl ether, ethylene glycol diethyl ether, and ethylene glycol methyl phenyl ether; a tertiary amine compound such as tetramethyl ethylene diamine, trimethylamine, triethylamine, and pyridine; an alkali metal alkoxide compound such as potassium-t-amyloxide and potassium-t-butyloxide; and a phosphine compound such as triphenyl phosphine. One type thereof may be solely used, and two or more types thereof may also be used in combination at any ratio.

The polymerization temperature is not restricted as long as the polymerization proceeds. The polymerization temperature is preferably 0° C. or higher, and more preferably 20° C. or higher, and is preferably 200° C. or lower, more preferably 100° C. or lower, and particularly preferably 80° C. or lower.

After the polymerization, the polymer may be collected from the reaction mixture by an optional method, if necessary. Examples of the method for collecting the polymer may include a steam stripping method, a direct desolvation method, and an alcohol coagulation method. When a solvent inert to a hydrogenation reaction is used during the polymerization as a reaction solvent, the polymer does not have to be collected from a polymerization solution and the polymer as it is may be subjected to a hydrogenation step.

The method for hydrogenating the polymer is not limited, and any optional method may be adopted. The hydrogenation may be performed, for example, by using an appropriate hydrogenation catalyst. More specifically, the hydrogenation may be performed in an organic solvent using a hydrogenation catalyst containing one or more metals selected from the group consisting of nickel, cobalt, iron, rhodium, palladium, platinum, ruthenium, and rhenium. The hydrogenation catalyst may be a heterogeneous catalyst or a homogeneous catalyst. As the hydrogenation catalyst, one type thereof may be solely used, and two or more types thereof may also be used in combination at any ratio.

As the heterogeneous catalyst, a metal or a metal compound may be used as it is or as the metal or metal compound supported on a suitable carrier. Examples of the carrier may include activated carbon, silica, alumina, calcium carbide, titania, magnesia, zirconia, diatomaceous earth, and silicon carbide. The amount of the catalyst to be supported on the carrier is preferably 0.01% by weight or more, and more preferably 0.05% by weight or more, and is preferably 80% by weight or less, and more preferably 60% by weight or less.

Examples of the homogeneous catalyst may include a catalyst including a compound of nickel, cobalt, or iron in combination with an organometallic compound (for example, an organoaluminum compound and an organolithium compound); and an organometallic complex catalyst of rhodium, palladium, platinum, ruthenium, or rhenium. Examples of the compound of nickel, cobalt, or iron may include an acetylacetone salt, a naphthenic acid salt, a cyclopentadienyl compound, and a cyclopentadienyl dichloro compound of these metals. Examples of the organoaluminum compound may include alkyl aluminum such as triethyl aluminum and triisobutyl aluminum; halogenated aluminum such as diethyl aluminum chloride and ethyl aluminum dichloride; and hydrogenated alkyl aluminum such as diisobutyl aluminum hydride.

Examples of the organometallic complex catalyst may include a metal complex such as a γ-dichloro-π-benzene complex, a dichloro-tris(triphenylphosphine) complex, and a hydride-chloro-triphenylphosphine complex of each of the aforementioned metals.

The amount of the hydrogenation catalyst to be used is preferably 0.01 parts by weight or more, more preferably 0.05 parts by weight or more, and particularly preferably 0.1 parts by weight or more, and is preferably 100 parts by weight or less, more preferably 50 parts by weight or less, and particularly preferably 30 parts by weight or less, relative to 100 parts by weight of the polymer.

The reaction temperature during the hydrogenation reaction is usually 10° C. to 250° C. From the viewpoint of increasing the hydrogenation rate and decreasing a polymer chain cleavage reaction, the reaction temperature is preferably 50° C. or higher, and more preferably 80° C. or higher, and is preferably 200° C. or lower, and more preferably 180° C. or lower. The pressure during the reaction is usually 0.1 MPa to 30 MPa. From the viewpoint of operability in addition to the viewpoint described above, the pressure is preferably 1 MPa or more, and more preferably 2 MPa or more, and is preferably 20 MPa or less, and more preferably 10 MPa or less.

The hydrogenation rate is preferably 90% or more, more preferably 95% or more, and particularly preferably 97% or more. When the hydrogenation rate is increased, low birefringence, thermal stability, and the like of the polymer (X) can be enhanced. The hydrogenation rate may be measured by $^1$H-NMR.

The glass transition temperature TgB of the amorphous polymer B satisfies TgB>TgA. Herein, TgA represents a glass transition temperature of the crystallizable polymer A contained in the substrate layer. Specifically, the glass transition temperature TgB of the amorphous polymer B is usually higher than TgA, preferably TgA+10° C. or higher, and more preferably TgA+20° C. or higher. When the glass transition temperature TgB of the amorphous polymer B contained in the first surface layer is higher than the glass transition temperature TgA of the crystallizable polymer A, stretching can appropriately be performed while occurrence of defects such as a wrinkle and a breakage is suppressed in the production of the optical layered body by a production method including a stretching step. Therefore, when the amorphous polymer B has the glass transition temperature TgB falling within the aforementioned range, stretching suitability of the optical layered body can be improved. In addition, since the heat resistance of the first surface layer which is the outermost layer of the optical layered body can be enhanced, heat resistance of the optical layered body itself can be improved.

The glass transition temperature TgB of the amorphous polymer B satisfies TcA−10° C.≥TgB≥TcA−60° C. Herein, TcA represents the crystallization temperature of the crystallizable polymer A. Specifically, the glass transition temperature TgB of the amorphous polymer B is usually TcA−60° C. or higher, preferably TcA−50° C. or higher, and more preferably TcA−40° C. or higher, and is usually TcA−10° C. or lower, preferably TcA−15° C. or lower, and more preferably TcA−20° C. or lower. When the glass transition temperature TgB of the amorphous polymer B is equal to or higher than the lower limit value of the aforementioned range, thermal deformation of the first surface layer can be suppressed during crystallization of the crystallizable polymer A contained in the substrate layer in a method for producing the optical layered body. When the glass transition temperature TgB of the amorphous polymer B is equal to or lower than the upper limit value, a desired plane orientation coefficient P can be easily achieved by relaxing the orientation of the first surface layer during crystallization of the crystallizable polymer A contained in the substrate layer.

The specific glass transition temperature TgB of the amorphous polymer B is preferably 100° C. or higher, more preferably 110° C. or higher, and particularly preferably 120° C. or higher, and is preferably 180° C. or lower, more preferably 170° C. or lower, and particularly preferably 160° C. or lower. When the glass transition temperature TgB of the amorphous polymer B is equal to or higher than the lower limit value of the aforementioned range, durability of the optical layered body in a high-temperature environment can be enhanced. When the glass transition temperature TgB is equal to or lower than the upper limit value of the aforementioned range, the stretching treatment of the optical layered body can be easily performed.

The saturated water absorption ratio of the amorphous polymer B is preferably 0.03% by weight or less, more preferably 0.02% by weight or less, and particularly preferably 0.01% by weight or less. When the saturated water absorption ratio falls within the aforementioned range, a change with the lapse of time in optical properties such as the retardation of the first surface layer containing the amorphous polymer B can be reduced. Further, deterioration of a polarizing plate and a display device that include the optical layered body can be suppressed, and the display of the display device can be stably kept favorable over a long period of time.

The saturated water absorption ratio is a percentage value of an increased weight of a sample after immersion in water at a certain temperature for a certain period of time relative to the weight of a test piece before the immersion. Usually, the sample is immersed in water at 23° C. for 24 hours and the weight of the sample is measured. The saturated water absorption ratio of the polymer can be adjusted within the aforementioned range, for example, by decreasing the amount of polar group in the polymer. From the viewpoint of decreasing the saturated water absorption ratio, it is preferable that the amorphous polymer B does not have a polar group.

The amount of the amorphous polymer B in the amorphous resin of the first surface layer is preferably 90.0% by weight to 100% by weight, and more preferably 95.0% by weight to 100% by weight. When the amount of the amorphous polymer B falls within the aforementioned range, delamination of the optical layered body can be effectively suppressed, and the properties of the amorphous polymer B can be sufficiently exerted.

In addition to the amorphous polymer B, the amorphous resin may further contain an optional component. Examples of the optional component may include additives including a colorant such as a pigment and a dye; a nucleating agent; a plasticizer; a fluorescent brightening agent; a dispersant; a thermostabilizer; a light stabilizer; an antistatic agent; an antioxidant; and a surfactant. As the optional component, one type thereof may be solely used, and two or more types thereof may also be used in combination at any ratio.

The plane orientation coefficient P of the first surface layer is usually 0.01 or less, preferably 0.008 or less, and more preferably 0.005 or less. A first surface layer having such a low plane orientation coefficient P represents that the degree of orientation in an in-plane direction of the polymer B contained in the first surface layer is low. When the plane orientation coefficient P of the first surface layer is low as described above, delamination can be effectively suppressed. Further, the retardation of the optical layered body can be usually reduced. The lower limit of the plane orientation coefficient P of the first surface layer is preferably 0.0005 or more from the viewpoint of facilitating formation of the first surface layer.

Herein, the plane orientation coefficient P of a certain layer is a value represented by $P=\{(nx+ny)/2\}-nz$. nx represents a refractive index in a direction which, among directions perpendicular to the thickness direction of the layer (in-plane directions), gives the maximum refractive index, ny represents a refractive index in a direction which is perpendicular to the direction of nx among the aforementioned in-plane directions of the layer, and nz represents a refractive index in the thickness direction of the layer. Unless otherwise specified, the measurement wavelength is 550 nm.

The thickness of the first surface layer is preferably 0.1 µm or more, more preferably 0.2 µm or more, and particularly preferably 0.3 µm or more, and preferably 20.0 µm or less, more preferably 15.0 µm or less, and particularly preferably 10.0 µm or less. When the thickness of the first surface layer is equal to or more than the lower limit value of the aforementioned range, delamination of the optical layered body can be effectively suppressed. When the thickness of the first surface layer is equal to or less than the upper limit value of the aforementioned range, the optical layered body can be made thin. When the thickness is equal to or less than the upper limit value, the substrate layer can be made relatively thick. Therefore, the tensile elastic modulus of the optical layered body can be increased relative to the total thickness.

[4. Second Surface Layer]

The second surface layer is a layer formed of a resin containing an amorphous polymer B'. By having the second surface layer in combination with the first surface layer, the optical layered body can effectively suppress delamination on both surfaces of the optical layered body.

As the amorphous polymer B', a range of the polymers described as the amorphous polymer B may be optionally used. As the resin contained in the second surface layer, a range of the resins described as the amorphous resin that may be contained in the first surface layer may be optionally used. Thus, the same effects as those of the first surface layer can be obtained for the second surface layer. The amorphous polymer B and the amorphous polymer B' may be the same as or different from each other. The resin contained in the second surface layer and the amorphous resin contained in the first surface layer may be the same as or different from each other. From the viewpoint of reducing the production costs and suppressing curling of the optical layered body, it is preferable that the resin contained in the second surface layer and the amorphous resin contained in the first surface layer are the same.

Properties such as the plane orientation coefficient P of the second surface layer may be optionally set within the range described as the properties of the first surface layer. Thereby the same effects as those of the first surface layer can be obtained for the second surface layer. The properties of the second surface layer and the properties of the first surface layer may be different from or the same as each other.

The thickness of the second surface layer may be optionally set within the range described as the thickness of the first surface layer. Thereby the same effects as those of the first surface layer can be obtained for the second surface layer. The thickness of the second surface layer and the thickness of the first surface layer may be different from each other. However, it is preferable that the thicknesses are the same as each other from the viewpoint of suppressing curling of the optical layered body.

[5. Optional Layer]

The optical layered body may include an optional layer, if necessary, in combination with the above-described substrate layer, first surface layer, and second surface layer. For example, the optical layered body may include an optional resin layer between the substrate layer and the first surface layer, and may include an optional resin layer between the substrate layer and the second surface layer. From the viewpoint of making the optical layered body thin, it is preferable that the optical layered body does not include the optional layer. Therefore, it is preferable that in the optical layered body, the substrate layer is in direct contact with the first surface layer without an optional layer interposed therebetween, and the substrate layer is in direct contact with the second surface layer without an optional layer interposed therebetween. Accordingly, it is preferable that the optical layered body is a film having a two-layer structure including the substrate layer and the first surface layer or a film having a three-layer structure including the first surface layer, the substrate layer, and the second surface layer in this order.

[6. Properties of Optical Layered Body]

As the optical layered body includes the first surface layer as the outermost layer, bonding of the surface of the first surface layer to an optional member does not tend to cause delamination. When the optical layered body includes the second surface layer, bonding of the surface of the second surface layer to an optional member does not either tend to cause delamination. Therefore, it is possible to achieve adhesion of the optical layered body to the optional member with a strong adhesion force.

The aforementioned adhesion force may be evaluated by peel strength. The peel strength represents the magnitude of a force required for peeling the optical layered body after establishing adhesion of the optical layered body to a certain member. For example, when adhesion of the optical layered body to an optional film is established, the peel strength required for peeling the optional film by drawing the optional film in a direction perpendicular to an adhesion face is usually 2.0 N or more per 15 mm width of the optical layered body. Even when the optional film is drawn by a force of 2.0 N per 15 mm width, the first surface layer of the optical layered body is not easily broken. Therefore, delamination does not tend to occur.

As the optical layered body includes the substrate layer formed of the crystallizable resin, the optical layered body can have a high rigidity. The specific rigidity of the optical layered body may be expressed by elastic modulus. The tensile elastic modulus of the optical layered body is preferably 3,000 MPa or more, more preferably 3,300 MPa or more, and particularly preferably 3,500 MPa or more. By having such a high tensile elastic modulus, the optical layered body has low tendency to cause deformation such as distortion even when the optical layered body has a large surface area, and also has excellent mechanical durability. The upper limit of the tensile elastic modulus is preferably 5,000 MPa or less, more preferably 4,800 MPa or less, and particularly preferably 4,500 MPa or less from the viewpoint of reducing the brittleness to increase the mechanical strength of the optical layered body.

The tensile elastic modulus of the optical layered body may be measured by the following method.

The optical layered body is cut out to have a rectangular test piece (10 mm in width×250 mm in length). A stress at which the test piece is drawn in the long side direction and deformed is measured in accordance with JIS K7113 using a tensile tester under conditions of a temperature of 23° C., a humidity of 60±5% RH, a distance between chucks of 115 mm, and a tensile speed of 100 mm/min. The measurement is repeated three times. From the measurement data of the measured stress and distortion corresponding to the stress, measurement data were selected in a range of the distortion of the test piece of 0.6% to 1.2% with intervals of 0.2% each. That is, the measurement data in which the distortion of the test piece is 0.6%, 0.8%, 1.0%, and 1.2% are selected. From the selected measurement data during three measurements, the tensile elastic modulus of the optical layered body is calculated using a least square method.

It is preferable that the optical layered body has low moisture permeability. Specifically, the moisture vapor transmission rate of the optical layered body is preferably 10 g/(m$^2$·24 h) or less, more preferably 8 g/(m$^2$·24 h) or less, and particularly preferably 5 g/(m$^2$·24 h) or less. Such a low moisture vapor transmission rate may be achieved by a method using a crystallizable alicyclic structure-containing polymer as the crystallizable polymer A and a method using an amorphous alicyclic structure-containing polymer as the amorphous polymer B or B'. The moisture vapor transmission rate of the optical layered body may be measured in accordance with JIS K 7129 A method under measurement conditions of a temperature of 40° C. and a humidity of 90% RH.

The retardation Re of the optical layered body is preferably 400 nm or less, more preferably 300 nm or less, and particularly preferably 200 nm or less. When the retardation of the optical layered body falls within the aforementioned range, display quality of a display device including the optical layered body can be effectively enhanced. For example, rainbow-like color unevenness of the display device can be effectively suppressed. The lower limit value of the retardation of the optical layered body is ideally 0 nm or more. From the viewpoint of facilitating production of the optical layered body, the lower limit value of the retardation is preferably 1 nm or more, and more preferably 2 nm or more.

It is preferable that the optical layered body has low ultraviolet transmittance. Specifically, the light transmittance of the optical layered body at a wavelength of 380 nm is preferably 10.0% or less, more preferably 8% or less, and particularly preferably 5% or less. This can improve the durability of a polarizing plate including the optical layered body, and can suppress deterioration of a liquid crystal panel of a liquid crystal display device, to which the optical layered body is applied, due to ultraviolet light. Any method may be adopted as the method for realizing such low ultraviolet transmittance. A method using a crystallizable resin containing an ultraviolet absorber may be adopted.

The total light transmittance of the optical layered body is preferably 85% to 100%, more preferably 87% to 100%, and particularly preferably 90% to 100%. The total light transmittance may be measured by using a spectrophotometer in accordance with JIS K0115.

The haze of the optical layered body is preferably 10% or less, more preferably 5% or less, and particularly preferably 3% or less. The haze may be measured by using a turbidimeter in accordance with JIS K7361-1997.

The amount of a volatile component contained in the optical layered body is preferably 0.1% by weight or less, more preferably 0.05% by weight or less, and further preferably 0.02% by weight or less. When the amount of the volatile component falls within the aforementioned range, size stability of the optical layered body can be improved, and a change in optical properties such as retardation with the lapse of time can be reduced. Further, deterioration of a polarizing plate and a display device that include the optical layered body can be suppressed, and the display of the display device can be stably kept favorable over a long period of time. Herein, the volatile component is a substance having a molecular weight of 200 or less. Examples of the volatile component may include a residual monomer and a solvent. The amount of the volatile component may be quantified by analysis through gas chromatography as a total of the substances having a molecular weight of 200 or less.

[7. Shape and Thickness of Optical Layered Body]

The optical layered body is usually a film-shaped member. The optical layered body may be a film in a sheet piece shape or a long-length film. The optical layered body is usually produced as a long-length film, bonded to an optional member if necessary, and cut out into a desired size for use.

The thickness of the optical layered body is preferably 10 µm or more, more preferably 15 µm or more, and particularly preferably 20 µm or more, and is preferably 50 µm or less, more preferably 40 µm or less, and particularly preferably 30 µm or less. When the thickness of the optical layered body is equal to or more than the lower limit value of the aforementioned range, rigidity of the optical layered body can be effectively enhanced. When the thickness is equal to or less than the upper limit value of the aforementioned range, the optical layered body can be made thin.

[8. Method for Producing Optical Layered Body]

The optical layered body has stretching properties. Therefore, the optical layered body has such an advantage that defects such as a wrinkle and a breakage do not tend to occur even stretching is performed during production. Accordingly, it is preferable that the optical layered body is produced by a production method including stretching. Preferable examples of the production method may include a production method including:

a first step of preparing a pre-stretch layered body including a layer formed of the crystallizable resin and a layer formed of the amorphous resin;

a second step of stretching the pre-stretch layered body to obtain a stretched layered body; and a third step of adjusting the temperature of the stretched layered body to a specific temperature.

[8.1. First Step]

In the first step, a pre-stretch layered body is prepared. For example, the pre-stretch layered body may be produced by a method including steps of separately preparing a film formed of the crystallizable resin and a film formed of the amorphous resin and bonding the prepared films to each other by using an adhesive, if necessary. For example, the pre-stretch layered body may also be produced by a production method including a step of forming the layer formed of the amorphous resin on the layer formed of the crystallizable resin by a layer-forming method such as an application method. For example, the pre-stretch layered body may be produced by a production method including a step of forming the layer formed of the crystallizable resin on the layer formed of the amorphous resin by a layer-forming method such as an application method. In particular, it is preferable that the pre-stretch layered body is produced by a production method including a step of simultaneously molding the crystallizable resin and the amorphous resin into a layer shape.

Examples of the method for simultaneously molding the crystallizable resin and the amorphous resin into a layer shape may include a method including a step of co-extruding or co-stretching the crystallizable resin and the amorphous resin. In particular, the co-extrusion is preferable because the production efficiency is excellent and the volatile component is unlikely to remain in the optical layered body.

The co-extrusion method includes an extrusion step of co-extruding the crystallizable resin and the amorphous resin. In the extrusion step, the crystallizable resin and the amorphous resin are each extruded into a layer shape in a melted state. Examples of the method for extruding a resin herein may include a co-extrusion T-die method, a co-extrusion inflation method, and a co-extrusion lamination method. Among these, a co-extrusion T-die method is preferable. The co-extrusion T-die method includes a feed block mode and a multi-manifold mode, and the multi-manifold mode is particularly preferable from the viewpoint of reducing the fluctuation of thickness.

The melting temperature of the extruded resins in the extrusion step is preferably Tg+80° C. or higher, and more preferably Tg+100° C. or higher, and is preferably Tg+180° C. or lower, and more preferably Tg+170° C. or lower. Herein, "Tg" represents the highest temperature among the glass transition temperatures of polymers contained in the crystallizable resin and the amorphous resin. When the melting temperature of the extruded resins is equal to or higher than the lower limit value of the aforementioned range, flowability of the resins can be sufficiently enhanced, and moldability can be improved. When the melting temperature is equal to or lower than the upper limit value, deterioration of the resins can be suppressed.

In the extrusion step, the temperature of the resins at a resin inlet of an extruder is preferably Tg to (Tg+100° C.), the temperature of the resins at an outlet of the extruder is preferably (Tg+50° C.) to (Tg+170° C.), and the temperature of a die is preferably (Tg+50° C.) to (Tg+170° C.).

The arithmetic average roughness of a die lip of the die used in the extrusion step is preferably 1.0 µm or less, more preferably 0.7 µm or less, and particularly preferably 0.5 µm or less. When the arithmetic average roughness of the die lip falls within the aforementioned range, occurrence of streak defects of the optical layered body can be easily suppressed.

In the co-extrusion method, layer-shaped melted resins hat have been extruded from the die lip are usually brought into close contact with a cooling roller, so as to be cooled and cured. In this case, examples of the method for bringing the melted resins into close contact with the cooling roller may include an air knife method, a vacuum box method, and an electrostatic adhesion method.

The number of cooling rollers is not particularly limited and is usually two or more. Examples of the method for arranging the cooling rollers may include a straight form, a Z form, and an L form. A procedure for passing the melted resins extruded from the die lip through the cooling rollers is not particularly limited.

[8.2. Second Step]

In the second step, the pre-stretch layered body obtained as described above is stretched to obtain a stretched layered body. The polymers in the resins are usually oriented in a stretching direction by stretching. By the orientation, the properties of the optical layered body can be controlled. By stretching, crystallization of the crystallizable polymer A contained in the crystallizable resin can be promoted while the polymer A is oriented. Therefore, the rigidity of the optical layered body can be enhanced.

In stretching, a uniaxial stretching treatment may be performed by a stretching treatment only in one direction, or a biaxial stretching treatment may be performed by a stretching treatment in two different directions. The biaxial stretching treatment to be performed may be a simultaneous biaxial stretching treatment wherein the stretching treatment is performed simultaneously in two directions, and may also be a sequential biaxial stretching treatment wherein the stretching treatment is performed in one direction and then performed in another direction. As the stretching treatment, any of a longitudinal stretching treatment performed by a stretching treatment in a lengthwise direction of the pre-stretch layered body, a transverse stretching treatment performed by a stretching treatment in a widthwise direction of the pre-stretch layered body, and a diagonal stretching treatment performed by stretching the film in a diagonal direction that is not parallel to or perpendicular to the widthwise direction of the pre-stretch layered body may be performed. Alternatively, a combination of any of them may also be performed. Examples of the method for the stretching treatment may include a roll method, a float method, and a tenter method.

The stretching temperature may be optionally set within a range in which an optical layered body having desired properties can be obtained. A suitable stretching temperature is preferably TgA or higher, more preferably TgA+10° C. or higher, and particularly preferably TgA+20° C. or higher, and preferably TgA+60° C. or lower, more preferably TgA+50° C. or lower, and further preferably TgA+40° C. or lower. Herein, TgA means the glass transition temperature of the crystallizable polymer A in the substrate layer, as described above. When the stretching temperature falls within the aforementioned range, stretching can be performed while occurrence of defects such as a wrinkle and a breakage is suppressed.

The stretching ratio may be optionally set within a range in which an optical layered body having desired properties can be obtained. Specifically, the range of the stretching ratio is preferably 1.01 times to 30 times, preferably 1.01 times to 10 times, and more preferably 1.01 times to 5 times.

[8.3. Third Step]

In the third step, a treatment for adjusting the temperature of the stretched layered body to a specific treatment temperature is performed to obtain the optical layered body. At the aforementioned treatment temperature, crystallization of the crystallizable polymer A contained in the crystallizable resin is promoted, and the degree of crystallinity is increased. Thereby an optical layered body having an excellent rigidity is obtained. At the aforementioned treatment temperature, the orientation of the amorphous polymers B and B' contained in the amorphous resin is relaxed. Thereby the plane orientation coefficient P of the first and second surface layers can be decreased.

In the third step, the stretched layered body is usually heated in a state wherein the size of the stretched layered body is fixed. As a result, while deformation of the stretched layered body due to heat shrinkage is suppressed, crystallization of the crystallizable polymer A can be promoted, and the orientation of the amorphous polymers B and B' can be relaxed. The specific operation in the treatment is not particularly limited. A heating procedure in which a heater is placed in a proximity of the stretched layered body while the state of the size of the stretched layered body being fixed is kept, and a heating procedure in which the stretched layered body is passed through a room of an oven or a furnace that is heated to a specific temperature while the state of the size of the stretched layered body being fixed is kept may be adopted.

The treatment temperature in the third step is preferably TcA−20° C. or higher, more preferably TcA−10° C. or higher, and particularly preferably TcA−5° C. or higher, and is preferably TcA+20° C. or lower, more preferably TcA+10° C. or lower, and particularly preferably TcA+5° C. or lower. Herein, TcA means the crystallization temperature of the crystallizable polymer A, as described above. At such a treatment temperature, the crystallization of the crystallizable polymer A can be readily advanced.

The treatment time of holding the treatment temperature in the third step is preferably 1 second or more, more preferably 3 seconds or more, and particularly preferably 5 seconds or more, and is preferably 3 minutes or less, more preferably 2 minutes or less, and particularly preferably 1 minute or less. When the treatment time is equal to or more than the lower limit value of the aforementioned range, the degree of crystallinity of the crystallizable polymer A is sufficiently increased. As a result, the rigidity of the optical layered body can be particularly enhanced, and the moisture permeability can be particularly reduced. Further, the orientation of the amorphous polymers B and B' is sufficiently relaxed. Therefore, the plane orientation coefficient P of the first and second surface layers can be effectively decreased. When the treatment time is equal to or less than the upper limit value of the aforementioned range, the optical layered body can be effectively produced.

[8.4. Optional Step]

The method for producing the optical layered body may further include an optional step in addition to the aforementioned steps.

[9. Polarizing Plate]

The polarizing plate of the present invention includes a polarizer and the optical layered body provided on at least one side of the polarizer.

As the polarizer, a film by which one of two linearly polarized lights that intersect at a right angle can be transmitted and the other can be absorbed or reflected may be used. Specific examples of the polarizer may include a product obtained by subjecting a film of a vinyl alcohol-based polymer such as polyvinyl alcohol and partially formalized polyvinyl alcohol to an appropriate treatment such as a dyeing treatment by iodine or a dichroic substance such as a dichroic dye, a stretching treatment, and a cross-linking treatment in an appropriate order by an appropriate method. In particular, a polarizer containing polyvinyl alcohol is preferable. The thickness of the polarizer is usually 5 μm to 80 μm.

The polarizing plate may be produced by bonding the optical layered body to one side of the polarizer. When the polarizer is bonded, an adhesive may be used, if necessary. The direction of bonding is optional. For example, when the polarizer is bonded to the surface of the first or second surface layer of the optical layered body, peeling of the optical layered body from the polarizer can be suppressed. For example, when the polarizer is bonded so that the first or second surface layer is the outermost layer of the polarizing plate, the surface of the first or second surface layer comes to the outermost surface of the polarizing plate. In this case, when the polarizing plate is bonded to an optional member, peeling of the polarizing plate can be suppressed.

The polarizing plate may further include an optional layer in combination with the above-described polarizer and optical layered body. For example, the polarizing plate may include an optional protective film layer other than the optical layered body for protection of the polarizer. Such a protective film layer is usually provided on a surface of the polarizer on a side opposite to the optical layered body.

[10. Display Device]

The display device of the present invention includes the aforementioned polarizing plate. Examples of the display device may include a liquid crystal display device and an organic electroluminescent display device. Among these, a liquid crystal display device is preferable. The liquid crystal display device usually includes a light source, a light source-side polarizing plate, a liquid crystal cell, and a visual recognition-side polarizing plate in this order. The polarizing plate including the optical layered body may be used as any of the light source-side polarizing plate and the visual recognition-side polarizing plate.

Examples of a driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents. In the following description, "%" and "part" that represent quantity are on the basis of weight, unless otherwise specified. The operation described below was performed under the conditions of normal temperature and normal pressure in atmospheric air, unless otherwise specified.

[Evaluation Method]

(Method for Measuring Thickness of Optical Layered Body)

The thickness of an optical layered body was measured by a contact-type film thickness meter (Dial Gauge manufactured by Mitutoyo Corporation).

The thickness of each layer contained in the optical layered body was determined by embedding the optical layered body in an epoxy resin, slicing the layered body into a thickness of 0.05 μm by a microtome, and observing the cross section of the optical layered body by a microscope.

(Method for Measuring Glass Transition Temperature and Crystallization Temperature of Polymer)

The glass transition temperature Tg and crystallization temperature Tc of a polymer were measured by increasing the temperature at 10° C./min using a differential scanning calorimeter (DSC). The melting point Tm was measured by a differential scanning calorimeter, and the average temperature of the glass transition temperature Tg and the melting point Tm was determined as the crystallization temperature Tc.

(Method for Measuring Plane Orientation Coefficient of First Surface Layer)

The refractive indices nx, ny, and nz of a first surface layer at a wavelength of 550 nm were measured by a refractive index meter ("Prism coupler refractive index meter Model 2010" manufactured by Metricon Corporation). The plane orientation coefficient P was calculated in accordance with the following expression.

$$P=\{(nx+ny)/2\}-nz$$

(Method for Measuring Tensile Elastic Modulus of Optical Layered Body)

The optical layered body was cut out to have a rectangular test piece (10 mm in width×250 mm in length). The stress at which the test piece was drawn in the long side direction and deformed was measured in accordance with JIS K7113 using a tensile tester equipped with a constant temperature and humidity chamber (5564 series digital material testing system manufactured by Instron Japan Co., Ltd.) under conditions of a temperature of 23° C., a humidity of 60±5% RH, a distance between chucks of 115 mm, and a tensile speed of 100 mm/min. The measurement was repeated three times. From the measurement data of the measured stress and distortion corresponding to the stress, measurement data were selected in a range of the distortion of the test piece of 0.6% to 1.2% with intervals of 0.2% each. That is, the measurement data in which the distortion of the test piece was 0.6%, 0.8%, 1.0%, and 1.2% were selected. From the selected measurement data during the three measurements, the tensile elastic modulus of the optical layered body was calculated using a least square method.

(Method for Evaluating Stretching Suitability)

A pre-stretch layered body in a stretching step was observed, and the stretching suitability was evaluated in accordance with the following criteria.

Good: No wrinkle nor breakage occurred.
Passable: A wrinkle or a breakage infrequently occurred.
Poor: A wrinkle or a breakage always occurred.

(Method for Measuring Moisture Vapor Transmission Rate of Optical Layered Body)

The moisture vapor transmission rate of the optical layered body was measured in accordance with JIS K 7129 A by using a moisture vapor transmission rate measurement device ("PERMATRAN W3/33" manufactured by MOCON, Inc.). The measurement was performed under measurement conditions of a temperature of 40° C. and a humidity of 90% RH.

(Method for Evaluating Peel Strength)

An unstretched film formed of a resin containing a norbornene-based polymer ("ZEONOR film" manufactured by ZEON Corporation, glass transition temperature of resin: 160° C., thickness: 100 μm) was prepared.

A surface of the optical layered body on a side of a first surface layer was subjected to a corona treatment. A surface of the unstretched film was subjected to a corona treatment. Onto the surface of the optical layered body that was subjected to the corona treatment and the surface of the unstretched film that was subjected to the corona treatment, a silane coupling agent was applied as an adhesive. The surfaces onto which the silane coupling agent was applied were bonded to each other. As a result, a sample film including the optical layered body and the unstretched film was obtained.

Subsequently, the sample film was cut to have a width of 15 mm. A surface of the cut sample film on a side of the optical layered body was bonded to a surface of a slide glass by using a two-sided tackiness tape ("CS9621" manufactured by Nitto Denko Corporation).

The unstretched film of the sample film bonded to the slide glass was gripped by an end of a force gauge and drawn in the normal direction of the surface of the slide glass. Thus, a 90° peel test was performed. A force measured during peeling of the unstretched film is a force required for peeling of the unstretched film from the optical layered body. Therefore, the magnitude of this force was measured as the peel strength.

From the measured peel strength, whether or not the optical layered body has a good quality of low tendency to cause delamination was evaluated in accordance with the following criteria.

Good: The peel strength was 2.0 N or more.
Poor: The peel strength was less than 2.0 N and material breakdown of the optical layered body occurred.

(Method for Measuring Retardation of Optical Layered Body)

The retardation of the optical layered body at a wavelength of 550 nm was measured by using a polarimeter ("AxoScan" manufactured by Axometrics, Inc.).

(Method for Measuring Light Transmittance of Optical Layered Body)

The light transmittance of the optical layered body at a wavelength of 380 nm was measured by using a spectrophotometer (ultraviolet-visible-near-infrared spectrophotometer "V-650" manufactured by JASCO Corporation) in accordance with JIS K 0115 (general rules for molecular absorptiometric analysis).

Production Example 1. Production of Crystallizable Alicyclic Structure-Containing Polymer (K1)

A metal pressure-resistant reaction vessel was sufficiently dried and the inside thereof was replaced with nitrogen. In the metal pressure-resistant reaction vessel, 154.5 parts of cyclohexane, 42.8 parts of a solution of 70% dicyclopentadiene (endo-isomer content: 99% or more) in cyclohexane (dicyclopentadiene amount: 30 parts), and 1.9 parts of 1-hexene were placed, and warmed to 53° C.

0.061 parts of a solution of 19% diethylaluminum ethoxide in n-hexane was added to a solution obtained by dissolving 0.014 parts of tetrachlorotungsten phenylimide(tetrahydrofuran) complex in 0.70 parts of toluene, and the mixture was stirred for 10 minutes to prepare a catalyst solution.

The catalyst solution was added to the pressure-resistant reaction vessel to initiate a ring-opening polymerization reaction. After that, the reaction was performed for 4 hours while the temperature was kept at 53° C., to obtain a solution of a ring-opening polymer of dicyclopentadiene.

The number-average molecular weight (Mn) and weight-average molecular weight (Mw) of the obtained ring-opening polymer of dicyclopentadiene were 8,750 and 28,100, respectively. The molecular weight distribution (Mw/Mn) calculated therefrom was 3.21.

To 200 parts of the obtained solution of the ring-opening polymer of dicyclopentadiene, 0.037 parts of 1,2-ethanediol was added as a terminator. The mixture was warmed to 60° C. and stirred for 1 hour, to terminate the polymerization reaction. To the mixture, 1 part of a hydrotalcite-like compound ("KYOWAAD (registered trademark) 2000" manufactured by Kyowa Chemical Industry Co., Ltd.) was added. The mixture was warmed to 60° C. and stirred for 1 hour. After that, 0.4 parts of a filtration aid ("RADIOLITE (registered trademark) #1500" manufactured by Showa Chemical Industry Co., Ltd.) was added, and the mixture was filtered through a PP pleated cartridge filter ("TCP-HX" manufactured by Advantec Toyo Kaisha, Ltd.) and separated into an adsorbent and the solution. Herein, "PP" is an abbreviation of polypropylene.

To 200 parts of the filtered solution of the ring-opening polymer of dicyclopentadiene (polymer amount: 30 parts), 100 parts of cyclohexane was added, and 0.0043 parts of chlorohydridecarbonyl tris(triphenylphosphine)ruthenium was then added to cause a hydrogenation reaction at a hydrogen pressure of 6 MPa and 180° C. for 4 hours. As a result, a reaction liquid containing a hydrogenated product of the ring-opening polymer of dicyclopentadiene was obtained. This reaction liquid was a slurry solution in which the hydrogenated product was deposited.

The hydrogenated product contained in the reaction liquid was separated from the solution by using a centrifugal separator and dried under reduced pressure at 60° C. for 24 hours, to obtain 28.5 parts of a crystallizable alicyclic structure-containing polymer (K1). The hydrogenation rate of the crystallizable alicyclic structure-containing polymer (K1) was 99% or more, the glass transition temperature Tg was 95° C., the crystallization temperature Tc was 180° C., the melting point Tm was 262° C., and the ratio of a racemo diad was 89%.

Production Example 2: Production of Amorphous Polymer (H2)

(Reaction at First Stage: Elongation of Block A1)

In a stainless-steel reaction vessel equipped with a stirrer which was sufficiently dried and the atmosphere in which was replaced with nitrogen, 320 parts of dehydrated cyclohexane, 55 parts of styrene, and 0.38 parts of dibutyl ether were charged. While the mixture was stirred at 60° C., 0.41 parts of a solution of n-butyl lithium (15% by weight cyclohexane solution) was added to initiate a polymerization reaction. The polymerization reaction at a first stage was thus performed. At the time point of one hour after the initiation of the reaction, a sample was obtained from the reaction mixture, and analyzed by gas chromatography (GC). As a result, the polymerization conversion ratio was 99.5%.

(Reaction at Second Stage: Elongation of Block B)

To the reaction mixture obtained by the reaction at the first stage, 40 parts of a monomer mixture consisting of 20 parts of styrene and 20 parts of isoprene was added, to continuously initiate a polymerization reaction at a second stage. At the time point of one hour after the initiation of the polymerization reaction at the second stage, a sample was obtained from the reaction mixture, and analyzed by GC. As a result, the polymerization conversion ratio was 99.5%.

(Reaction at Third Stage: Elongation of Block A2)

To the reaction mixture obtained by the reaction at the second stage, 5 parts of styrene was added, to continuously initiate a polymerization reaction at a third stage. At the time point of one hour after the initiation of the polymerization reaction at the third stage, a sample was obtained from the reaction mixture. The weight-average molecular weight Mw and number-average molecular weight Mn of the polymer were measured. At that time point, the obtained sample was analyzed by GC. As a result, the polymerization conversion ratio was approximately 100%. Immediately after that, to the reaction mixture, 0.2 parts of isopropyl alcohol was added to terminate the reaction. As a result, a mixture containing a polymer having a triblock molecular structure A1-B-A2 was obtained.

In the reaction at the first stage and the reaction at the second stage, the polymerization reaction was allowed to sufficiently proceed. Therefore, it is considered that the polymerization conversion ratio is approximately 100% and the ratio by weight St/IP in the block B is 20/20. This shows that the obtained polymer is a polymer having a triblock molecular structure in which St-(St/Ip)-St is 55-(20/20)-5. The weight-average molecular weight (Mw) of the polymer was 105,500, and the molecular weight distribution (Mw/Mn) was 1.04.

Subsequently, the aforementioned mixture containing the polymer was transferred to a pressure-resistant reaction vessel equipped with a stirrer, 8.0 parts of a nickel catalyst supported on a diatomaceous earth ("E22U" manufactured by JGC Catalysts and Chemicals Ltd., nickel supported amount: 60%) as a hydrogenation catalyst and 100 parts of dehydrated cyclohexane were added thereto and mixed. The inside of the reaction vessel was replaced with a hydrogen gas. Hydrogen was further supplied while the solution was stirred. Thus, a hydrogenation reaction was performed at a temperature of 190° C. and a pressure of 4.5 MPa for 6 hours. The weight-average molecular weight (Mw) of the hydrogenated product of the polymer contained in the reaction solution obtained by the hydrogenation reaction was 111,800, and the molecular weight distribution (Mw/Mn) was 1.05.

After completion of the hydrogenation reaction, the reaction solution was filtered to remove the hydrogenation catalyst. After that, 2.0 parts of a solution of 0.1 parts of pentaerythrityl tetrakis[3-(3,5-di-t-butyl-4-hydroxyphenyl) propionate] ("Songnox1010" manufactured by Songwon Industrial Co., Ltd.) as a phenol-based antioxidant in xylene was added and dissolved.

Subsequently, the solution was dried by using a cylindrical concentrating and drying device ("Kontro" manufactured by Hitachi, Ltd.) at a temperature 260° C. and a pressure of 0.001 MPa or less, and the solvent cyclohexane and xylene, and other volatile components were removed from the solution. The melted polymer obtained after drying was extruded from a die into a strand shape, cooled, and then molded by a pelletizer, to produce 95 parts of pellets of an amorphous polymer (H2) as a polymer (X).

The glass transition temperature Tg of the obtained amorphous polymer (H2) was 130° C., the weight-average molecular weight (Mw) was 110,300, the molecular weight distribution (Mw/Mn) was 1.10, and the hydrogenation rate was approximately 100%.

Example 1

(1-1. Preparation of Resin for Substrate Layer)

93.0 parts of the crystallizable alicyclic structure-containing polymer (K1) obtained in Production Example 1 and 7.0 parts of a benzotriazole-based ultraviolet absorber ("LA-31" manufactured by ADEKA Corporation) were mixed by a biaxial extruder, to obtain a mixture. Subsequently, the mixture was fed to a hopper connected to an extruder, supplied to the uniaxial extruder, and melt-extruded, to prepare a crystallizable resin for a substrate layer.

(1-2. Preparation of Resin for Surface Layer)

A norbornene-based polymer ("ZEONOR 1600" manufactured by ZEON Corporation, glass transition temperature: 160° C.) as an amorphous polymer (H1) containing an alicyclic structure was prepared as an amorphous resin for a surface layer.

(1-3. Extrusion Step)

The resin for a substrate layer prepared in the aforementioned step (1-1) was fed to a hopper. The fed resin for a substrate layer was supplied to a multi-manifold die.

The resin for a surface layer prepared in the aforementioned step (1-2) was fed to another hopper. The supplied resin for a surface layer was supplied to the multi-manifold die.

Subsequently, the resins were discharged from the multi-manifold die in a film shape and cast on a cooling roller. By such a co-extrusion method, a long-length pre-stretch layered body including "a first surface layer formed of the amorphous resin"/"a substrate layer formed of the crystallizable resin"/"a second surface layer formed of the amorphous resin" in this order was obtained.

(1-4. Stretching Step)

The pre-stretch layered body was supplied to a tenter device provided with clips capable of holding both ends of the pre-stretch layered body in the widthwise direction and rails capable of guiding the clips, and stretched by the tenter device. Stretching was performed under conditions of a stretching ratio in the lengthwise direction of 2.0, a stretching ratio in the widthwise direction of 2.0, and a stretching temperature of 120° C. As a result, a long-length stretched layered body was obtained.

(1-5. Crystallization Step)

The stretched layered body was subjected to a heating treatment, to promote crystallization of the crystallizable alicyclic structure-containing polymer (K1) contained in the substrate layer. The heating treatment was performed under conditions of a heating temperature of 180° C. and a heating time of 30 seconds. The heating treatment was performed while both ends of the stretched layered body in the widthwise direction were held by the clips of the tenter device and the size was fixed, so as not to allow shrinkage of the stretched layered body. As a result, a long-length optical layered body including "the first surface layer containing the amorphous polymer (H1) (thickness: 5.0 µm)"/"the substrate layer containing the crystallizable alicyclic structure-containing polymer (K1) (thickness: 20.0 µm)"/"the second surface layer containing the amorphous polymer (H1) (thickness: 5.0 µm)" in this order was obtained. The obtained optical layered body was evaluated by the aforementioned methods.

Example 2

The thickness of extrusion of each resin was adjusted during extrusion of the resin in the aforementioned step (1-3) so that an optical layered body including layers having respective thicknesses shown in Table 1 was obtained. A long-length optical layered body was produced and evaluated in the same manner as those in Example 1 except for the aforementioned matter.

Example 3

The thickness of extrusion of each resin was adjusted during extrusion of the resin in the aforementioned step (1-3) so that an optical layered body including layers having respective thicknesses shown in Table 1 was obtained. A long-length optical layered body was produced and evaluated in the same manner as those in Example 1 except for the aforementioned matter.

Example 4

In the aforementioned step (1-1), the crystallizable alicyclic structure-containing polymer (K1) obtained in Production Example 1 itself was prepared as a crystallizable resin for a substrate layer containing no ultraviolet absorber. A long-length optical layered body was produced and evaluated in the same manner as those in Example 1 except for the aforementioned matter.

Example 5

In the aforementioned step (1-1), the crystallizable alicyclic structure-containing polymer (K1) obtained in Production Example 1 itself was prepared as a crystallizable resin for a substrate layer containing no ultraviolet absorber. In the aforementioned step (1-3), a multi-manifold die was changed so that an optical layered body including a first surface layer and a substrate layer having respective thicknesses shown in Table 1 (an optical layered body having no second surface layer) was obtained. A long-length optical layered body was produced and evaluated in the same manner as those in Example 1 except for the aforementioned matters.

Example 6

In the aforementioned step (1-2), the amorphous polymer (H2) produced in Production Example 2 was prepared in place of the amorphous polymer (H1) as an amorphous resin for a surface layer. A long-length optical layered body was produced and evaluated in the same manner as those in Example 1 except for the aforementioned matter.

Example 7

In the aforementioned step (1-2), a norbornene-based polymer ("ZEONOR 1430" manufactured by ZEON Corporation, glass transition temperature: 140° C.) as an amorphous polymer (H3) containing an alicyclic structure was prepared in place of the amorphous polymer (H1) as an amorphous resin for a surface layer. A long-length optical layered body was produced and evaluated in the same manner as those in Example 1 except for the aforementioned matter.

Example 8

The thickness of extrusion of each resin was adjusted during extrusion of the resin in the aforementioned step (1-3) so that an optical layered body including layers having respective thicknesses shown in Table 1 was obtained. A long-length optical layered body was produced and evaluated in the same manner as those in Example 1 except for the aforementioned matter.

Example 9

The thickness of extrusion of each resin was adjusted during extrusion of the resin in the aforementioned step (1-3) so that an optical layered body including layers having respective thicknesses shown in Table 1 was obtained. A long-length optical layered body was produced and evaluated in the same manner as those in Example 4 except for the aforementioned matter.

Comparative Example 1

In the aforementioned step (1-2), the crystallizable alicyclic structure-containing polymer (K1) produced in Production Example 1 was prepared in place of the amorphous polymer (H1) as a resin for a surface layer. A long-length optical layered body was produced and evaluated in the same manner as those in Example 1 except for the aforementioned matter.

Comparative Example 2

In the aforementioned step (1-1), a norbornene-based polymer ("ZEONOR 1600" manufactured by ZEON Corporation, glass transition temperature of resin: 160° C.) as the amorphous polymer (H1) containing an alicyclic structure was used in place of the crystallizable alicyclic structure-containing polymer (K1) produced in Production Example 1 for preparing a resin for a substrate layer. A long-length optical layered body was produced and evaluated in the same manner as those in Example 1 except for the aforementioned matter.

Comparative Example 3

In the aforementioned step (1-1), the amorphous polymer (H2) produced in Production Example 2 was used in place of the crystallizable alicyclic structure-containing polymer (K1) produced in Production Example 1 for preparing a resin for a substrate layer.

In the aforementioned step (1-2), the amorphous polymer (H2) produced in Production Example 2 was prepared in place of the amorphous polymer (H1) as an amorphous resin for a surface layer.

The thickness of extrusion of each resin was adjusted during extrusion of the resin in the aforementioned step (1-3) so that an optical layered body including layers having respective thicknesses shown in Table 1 was obtained.

A long-length optical layered body was produced and evaluated in the same manner as those in Example 1 except for the aforementioned matters.

Comparative Example 4

In the aforementioned step (1-1), a norbornene-based polymer ("ZEONOR 1430" manufactured by ZEON Corporation, glass transition temperature: 140° C.) as the amorphous polymer (H3) containing an alicyclic structure was used in place of the crystallizable alicyclic structure-containing polymer (K1) produced in Production Example 1 for preparing a resin for a substrate layer.

In the aforementioned step (1-2), a norbornene-based polymer as the amorphous polymer (H3) containing an alicyclic structure was prepared in place of the amorphous polymer (H1) as a resin for a surface layer.

The thickness of extrusion of each resin was adjusted during extrusion of the resin in the aforementioned step (1-3) so that an optical layered body including layers having respective thicknesses shown in Table 1 was obtained.

A long-length optical layered body was produced and evaluated in the same manner as those in Example 1 except for the aforementioned matters.

Comparative Example 5

The thickness of extrusion of each resin was adjusted during extrusion of the resin in the aforementioned step (1-3) so that an optical layered body including layers having respective thicknesses shown in Table 1 was obtained. A long-length optical layered body was produced and evaluated in the same manner as those in Example 1 except for the aforementioned matters.

The long-length optical layered body was produced and evaluated in the same manner as those in Example 1 except for the aforementioned matters.

[Results]

The results in Examples and Comparative Examples are shown in Tables 1 and 2. Meanings of the abbreviations in Tables 1 and 2 are as follows.

UVA concentration: concentration of ultraviolet absorber in substrate layer

Tg: glass transition temperature

Tc: crystallization temperature

P: plane orientation coefficient

Re: retardation

UV transmittance: light transmittance at a wavelength of 380 nm

TABLE 1

[Results of Examples]

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Substrate layer | | | | | | | | | |
| Polymer | K1 | K1 | K1 | K1 | K1 | K1 | K1 | K1 | K1 |
| UVA concentration [%] | 7 | 7 | 7 | 0 | 0 | 7 | 7 | 7 | 0 |
| Thickness [μm] | 20 | 15 | 10 | 20 | 20 | 20 | 20 | 28 | 28 |
| Tg[° C.] | 95 | 95 | 95 | 95 | 95 | 95 | 95 | 95 | 95 |
| Tc[° C.] | 180 | 180 | 180 | 180 | 180 | 180 | 180 | 180 | 180 |
| Ratio of substrate layer thickness relative to total thickness of optical layered body [%] | 66.7 | 50 | 33.3 | 66.7 | 66.7 | 66.7 | 66.7 | 93.3 | 93.3 |
| First surface layer | | | | | | | | | |
| Polymer | H1 | H1 | H1 | H1 | H1 | H2 | H3 | H1 | H1 |
| Thickness [μm] | 5 | 7.5 | 10 | 5 | 10 | 5 | 5 | 1 | 1 |
| Tg[° C.] | 160 | 160 | 160 | 160 | 160 | 130 | 140 | 160 | 160 |
| P | 0.004 | 0.004 | 0.004 | 0.004 | 0.004 | 0.002 | 0.002 | 0.004 | 0.004 |
| Second surface layer | | | | | | | | | |
| Polymer | H1 | H1 | H1 | H1 | — | H2 | H3 | H1 | H1 |
| Thickness [μm] | 5 | 7.5 | 10 | 5 | — | 5 | 5 | 1 | 1 |
| Tg[° C.] | 160 | 160 | 160 | 160 | — | 130 | 140 | 160 | 160 |
| Tensile elastic modulus [MPa] | 3800 | 3500 | 3100 | 3900 | 3800 | 3400 | 3800 | 4000 | 4000 |
| Stretching suitability | Good | Good | Passable | Good | Good | Good | Good | Good | Good |
| moisture vapor transmission rate [g/m² · 24 h] | 2.1 | 2.5 | 2.8 | 2.1 | 2.1 | 5.3 | 4.5 | 2 | 2 |
| Delamination property (Peel strength) | Good | Good | Good | Good | Good | Good | Good | Good | Good |
| Re [nm] | 23 | 20 | 15 | 24 | 25 | 22 | 23 | 25 | 25 |
| UV transmittance [%] | 0.16 | 0.77 | 3.79 | 89.6 | 90.1 | 0.16 | 0.15 | 0.14 | 0.14 |

TABLE 2

Results of Comparative Examples

| | Comp. Ex. 1 | Comp. Ex. 2 | Comp. Ex. 3 | Comp. Ex. 4 | Comp. Ex. 5 |
|---|---|---|---|---|---|
| Substrate layer | | | | | |
| Polymer | K1 | H1 | H2 | H3 | K1 |
| UVA concentration [%] | 7 | 7 | 7 | 7 | 7 |
| Thickness [μm] | 20 | 20 | 20 | 20 | 5 |
| Tg [° C.] | 95 | 160 | 130 | 140 | 95 |
| Tc [° C.] | 180 | — | — | — | 180 |
| Ratio of substrate layer thickness relative to total thickness of optical layered body [%] | 66.7 | 66.7 | 64.5 | 62.5 | 16.7 |
| First surface layer | | | | | |
| Polymer | K1 | H1 | H2 | H3 | H1 |
| Thickness [μm] | 5 | 5 | 6 | 7 | 12.5 |
| Tg [° C.] | 95 | 160 | 130 | 140 | 160 |
| P | 0.0147 | 0.004 | 0.002 | 0.002 | 0.004 |
| Second surface layer | | | | | |
| Polymer | K1 | H1 | H2 | H3 | H1 |
| Thickness [μm] | 5 | 5 | 5 | 5 | 12.5 |
| Tg [° C.] | 95 | 160 | 130 | 140 | 160 |
| Tensile elastic modulus [MPa] | 4500 | 2400 | 1400 | 2200 | 2700 |
| Stretching suitability | Good | Poor | Passable | Poor | Poor |
| moisture vapor transmission rate [g/m² · 24 h] | 1.8 | 3.5 | 9.8 | 3.6 | 3.2 |
| Delamination property (Peel strength) | Poor | Good | Good | Good | Good |
| Re [nm] | 34 | 5 | 2 | 2 | 10 |
| UV transmittance [%] | 0.17 | 0.16 | 0.16 | 0.15 | 18.6 |

[Discussion]

As seen from the results of Comparative Example 1, delamination easily occurs in the optical layered body containing the crystallizable resin in the surface layer, and therefore, the peel strength is small. As seen from the results of Comparative Example 5, even the optical layered body including the substrate layer formed of the crystallizable resin and the surface layer formed of the amorphous resin in combination may result in poor stretching suitability. In contrast, Examples 1 to 9 resulted in low tendency to cause delamination. As a result, high peel strength is obtained, and excellent stretching suitability is achieved. It was confirmed on the basis of the aforementioned results that the present invention can provide an optical layered body that includes a layer formed of a resin containing a crystallizable polymer, the layered body having low tendency to cause delamination, and having a capability to be easily produced by a production method including a stretching step.

REFERENCE SIGN LIST

100 optical layered body
110 substrate layer
120 first surface layer
200 optical layered body
230 second surface layer

The invention claimed is:

1. An optical layered body comprising: a substrate layer formed of a resin containing a crystallizable polymer A; and a first surface layer formed of a resin containing an amorphous polymer B, wherein
   a glass transition temperature TgA of the crystallizable polymer A and a glass transition temperature TgB of the amorphous polymer B satisfy TgB>TgA,
   a crystallization temperature TcA of the crystallizable polymer A and the glass transition temperature TgB of the amorphous polymer B satisfy TcA−10° C.≥TgB≥TcA−60° C.,
   the first surface layer has a plane orientation coefficient P that satisfies P≤0.01, and
   a ratio of a thickness of the substrate layer relative to a total thickness of the optical layered body is 25% or more.

2. The optical layered body according to claim 1, having a tensile elastic modulus of 3,000 MPa or more.

3. The optical layered body according to claim 1, having a retardation of 400 nm or less.

4. The optical layered body according to claim 1, having a moisture vapor transmission rate of 10 g/(m²·24 h) or less.

5. The optical layered body according to claim 1, having a transmittance at a wavelength of 380 nm of 10% or less.

6. The optical layered body according to claim 1, wherein the substrate layer is in direct contact with the first surface layer.

7. The optical layered body according to claim 1, wherein
   the crystallizable polymer A is a crystallizable polymer containing an alicyclic structure, and
   the amorphous polymer B is an amorphous polymer containing an alicyclic structure.

8. The optical layered body according to claim 1, comprising a second surface layer on a side opposite to the first surface layer of the substrate layer, the second surface layer being formed of a resin containing an amorphous polymer B'.

9. A polarizing plate comprising:
   the optical layered body according to claim 1; and
   a polarizer, wherein
   the first surface layer of the optical layered body is an outermost layer of the polarizing plate.

10. A display device comprising the polarizing plate according to claim 9.

11. A method for producing an optical layered body, the optical layered body including a substrate layer formed of a resin containing a crystallizable polymer A, and a first surface layer formed of a resin containing an amorphous polymer B,
    a glass transition temperature TgA of the crystallizable polymer A and a glass transition temperature TgB of the amorphous polymer B satisfying TgB>TgA,
    a crystallization temperature TcA of the crystallizable polymer A and the glass transition temperature TgB of the amorphous polymer B satisfying TcA−10° C.≥TgB≥TcA−60° C.,
    a ratio of a thickness of the substrate layer relative to a total thickness of the optical layered body being 25% or more,
    the production method comprising
    a first step of preparing a pre-stretch layered body including a layer formed of a resin containing the crystallizable polymer A and a layer formed of a resin containing the amorphous polymer B;
    a second step of stretching the pre-stretch layered body at a temperature of TgA or higher and TgA+60° C. or lower to obtain a stretched layered body; and
    a third step of adjusting a temperature of the stretched layered body to a temperature of TcA−20° C. or higher and TcA+20° C. or lower.

12. The method for producing an optical layered body according to claim 11, wherein the first step includes a step of co-extruding or co-stretching the resin containing the crystallizable polymer A and the resin containing the amorphous polymer B.

13. The method for producing an optical layered body according to claim 11, wherein
    the first step includes:
    a step of forming the layer of the resin containing the amorphous polymer B on the layer formed of the resin containing the crystallizable polymer A, or
    a step of forming the layer formed of the resin containing the crystallizable polymer A on the layer of the resin containing the amorphous polymer B.

14. The method for producing an optical layered body according to claim 11, wherein the substrate layer is in direct contact with the first surface layer.

* * * * *